(12) United States Patent
Ravishankar et al.

(10) Patent No.: US 11,916,654 B2
(45) Date of Patent: Feb. 27, 2024

(54) INTEGRATED MEO-LEO SATELLITE COMMUNICATION SYSTEM

(71) Applicant: HUGHES NETWORK SYSTEMS LLC, Germantown, MD (US)

(72) Inventors: Channasandra Ravishankar, Clarksburg, MD (US); Xiaoling Huang, Germantown, MD (US); John E. Corrigan, III, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 17/535,823

(22) Filed: Nov. 26, 2021

(65) Prior Publication Data

US 2023/0059412 A1    Feb. 23, 2023

Related U.S. Application Data

(60) Provisional application No. 63/233,738, filed on Aug. 16, 2021.

(51) Int. Cl.
 *H04B 7/185* (2006.01)
 *H04L 9/40* (2022.01)

(52) U.S. Cl.
 CPC ..... *H04B 7/18584* (2013.01); *H04B 7/18521* (2013.01); *H04B 7/18526* (2013.01); *H04L 63/0435* (2013.01)

(58) Field of Classification Search
 None
 See application file for complete search history.

(56) References Cited

U.S. PATENT DOCUMENTS

| 9,763,167 | B2 | 9/2017 | Gopal et al. | |
|---|---|---|---|---|
| 2012/0263042 | A1 | 10/2012 | Natarajan et al. | |
| 2016/0359641 | A1 | 12/2016 | Bhat et al. | |
| 2018/0084476 | A1* | 3/2018 | Kay | H04L 45/243 |

(Continued)

OTHER PUBLICATIONS

International Search Report and Written Opinion dated Nov. 23, 2022 in corresponding PCT/US2022/040098.

(Continued)

*Primary Examiner* — Shripal K Khajuria
(74) *Attorney, Agent, or Firm* — NovoTechIP International PLLC

(57) ABSTRACT

A satellite communication system that combines the benefits of Medium Earth Orbit (MEO) and Low Earth Orbit (LEO) satellite systems into an MEO-LEO satellite system. The MEO-LEO system includes an LEO constellation combined with a MEO constellation where the LEO constellation may provide global coverage with broad average capacity and may support 'hot spot' coverage where desired. The MEO constellation may provide unique advantages including backhaul to ground in remote areas, higher traffic density for key locations, and a secure global backhaul for key customers. Data may be routed over optical inter-satellite links using Software Defined Networking concepts to provide MEO-LEO (backhaul and ground access), LEO-LEO (upstream & downstream); and (3) MEO-MEO (crosslinks & downlinks). Further, implementations described herein include secure user terminal (UT) to UT IP routing in the constellation for direct UT to UT communication.

20 Claims, 17 Drawing Sheets

(56) References Cited

U.S. PATENT DOCUMENTS

2019/0082481 A1    3/2019  Ravishankar
2021/0092640 A1*   3/2021  Ravishankar ......... H04W 48/18
2023/0019858 A1*   1/2023  Scott ................. H04B 7/18513

OTHER PUBLICATIONS

International Search Report and Written Opinion dated Nov. 24, 2022 in corresponding PCT/US2022/040103.
Li et al.,, "Load-Balanced Cooperative Transmission in MEO-LEO Satellite Network", 2018 IEEE 32ND International Conference on Advanced Information Networking and Applications (AINA), IEEE, May 16, 2018 (May 16, 2018), pp. 564-571.
International Search Report and Written Opinion dated Mar. 27, 2023 in related PCT/US2022/40391.
Ravishankar et al., "Next-generation global satellite system with mega-constellations", International Journal of Satellit Communications and Networking, vol. 39, No. 1, Jul. 24, 2020 (Jul. 24, 2020), pp. 6-28.
Non-final office action dated Apr. 5, 2023 in related U.S. Appl. No. 17/565,574.
Final office action dated Jul. 20, 2023 in related U.S. Appl. No. 17/565,574.

* cited by examiner

LEO Constellation Parameters (432 satellites)

INTEGRATED MEO-LEO SATELLITE COMMUNICATION SYSTEM

CROSS-REFERENCE TO RELATED APPLICATION

This application claims priority to U.S. Provisional Patent Application No. 63/233,738, filed Aug. 16, 2021, and entitled "SYSTEMS AND METHODS FOR INTEGRATED MEO-LEO SATELLITE SYSTEM," the disclosure of which is hereby incorporated by reference in its entirety.

BACKGROUND

The need for high-speed broadband connections is universally important throughout the world. Many areas are not served or are underserved by fiber, cable, and/or other terrestrial systems for providing broadband coverage. Satellite systems can provide global high-speed coverage and may reach areas unserved or underserved. Thus, there is a significant need for new and improved mechanisms for providing satellite-based communication systems coverage.

Satellites which provide satellite-based broadband communication may be located at different altitudes above the earth. Satellites in a Low Earth Orbit (LEO) are typically about 2000 km and below. A Geostationary Orbit (GEO) satellite is 35,786 km above the earth. A Medium Earth Orbit (MEO) is greater in altitude than that of the LEO and less than that of the GEO, or about 2000 km to 35,786 km. As used herein, a constellation is a group of satellites at a given altitude.

SUMMARY

The instant disclosure describes a technical solution to the problem of providing global coverage for satellite communication systems that combines the benefits of Medium Earth Orbit (MEO) and Low Earth Orbit (LEO) satellite systems into an integrated MEO-LEO satellite communication system. The MEO-LEO communication system described herein includes an LEO constellation combined with a MEO constellation where the LEO constellation may provide global coverage with broad average capacity and may support 'hot spot' coverage where desired. The MEO constellation may provide unique advantages including backhaul to ground in remote areas (such as but not limited to deep ocean areas), higher traffic density for key locations, and a secure global backhaul for key customers. Data may be routed over optical inter-satellite links using Software Defined Networking (SDN) concepts to provide: (1) MEO-LEO (backhaul and ground access); (2) LEO-LEO (upstream & downstream); and (3) MEO-MEO (crosslinks & downlinks). Further, implementations described herein include secure user terminal (UT) to UT IP routing in the constellation for direct UT to UT communication.

The LEO and MEO constellation satellites may form a mega constellation comprising many satellites orbiting the Earth. Such a mega constellation may include hundreds or even thousands of satellites. Communications are facilitated using intra-constellation and inter-constellation cross links as described herein. Technical benefits of a MEO-LEO satellite system include global consumer and enterprise Internet Protocol (IP) data, and the ability to provide secure IP data services between users and/or enterprises without traversing gateways and associated terrestrial links. Another technical benefit is SDN routing capabilities that provide complete functionality at any stage of deployment. Routes are determined by a central ground controller, and routing tables are uplinked to satellites. Yet another technical benefit of the MEO-LEO satellite system is that Space-based Phased Array antenna support multiple modes to provide support for hot-spots and high-density areas, uniform density coverage, and "earth fixed" operation and "satellite fixed" operation narrowband operations with improved link margins.

An example of disclosed systems herein can include a Medium Earth Orbit (MEO) satellite constellation with a plurality of MEO satellites; a Low Earth Orbit (LEO) satellite constellation with a plurality of LEO satellites; and wherein the plurality of MEO satellites and the plurality of LEO satellites are configured to support a MEO-LEO satellite link that allows communication between a MEO satellite in the MEO constellation and a LEO satellite in the LEO constellation.

An example of disclosed systems herein can include a Medium Earth Orbit (MEO) satellite constellation with a plurality of MEO satellites; a Low Earth Orbit (LEO) satellite constellation with a plurality of LEO satellites; wherein the plurality of MEO satellites and the plurality of LEO satellites are configured to support a MEO-LEO satellite link that allows communication between a MEO satellite in the MEO constellation and a LEO satellite in the LEO constellation; a first user terminal communicating with a first LEO satellite and a second LEO satellite communicating with a second user terminal located at a geographical location remote from that of the first user terminal; a direct user terminal to user terminal security association that supports sending encrypted data directly from the first user terminal to the second user terminal with a private key; wherein: the plurality of MEO satellites and the LEO satellite further comprise an MEO-LEO link for communicating with a satellite in another constellation; and the satellite communication system provides a non-terrestrial communication path directly from the first user terminal to the second user terminal by communications between the first and second LEO satellites in the LEO constellation and the MEO satellite in the MEO constellation.

An example of disclosed systems herein can include a Medium Earth Orbit (MEO) satellite constellation with a plurality of MEO satellites; a Low Earth Orbit (LEO) satellite constellation with a plurality of LEO satellites; and wherein the plurality of MEO satellites and the plurality of LEO satellites are configured to support a MEO-LEO satellite link that allows communication between a MEO satellite in the MEO constellation and a LEO satellite in the LEO constellation, wherein the plurality of MEO satellites and the LEO satellite further comprise an optical inter-satellite link for communicating with a satellite in another constellation; a first user terminal communicating with a first LEO satellite and a second LEO satellite communicating with a second user terminal located at a geographical location remote from that of the first user terminal; a direct user terminal to user terminal security association that supports sending encrypted data directly from the first user terminal to the second user terminal with a private key; a direct user terminal to user terminal control plane communication between a first radio resource control user (RRC-U) block in the first user terminal and a second RRC-U block in the second user terminal; wherein: the plurality of MEO satellites and the LEO satellites further comprise an MEO-LEO link for communicating with a satellite in another constellation; the satellite communication system provides a non-terrestrial communication path directly from the first user terminal to the second user terminal by communications between the first and second LEO satellites in the LEO constellation and the MEO satellite in the MEO constellation, and at least one satellite of the LEO constellation and MEO satellite constellation has a link to communicate with a geosynchronous satellite system.

This Summary identifies example features and aspects and is not an exclusive or exhaustive description of the disclosed subject matter. Whether features or aspects are included in or omitted from this Summary is not intended as indicative of relative importance of such features. Additional features and aspects are described, and others will become apparent to persons skilled in the art upon reading the following detailed description and viewing the drawings that form a part thereof.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
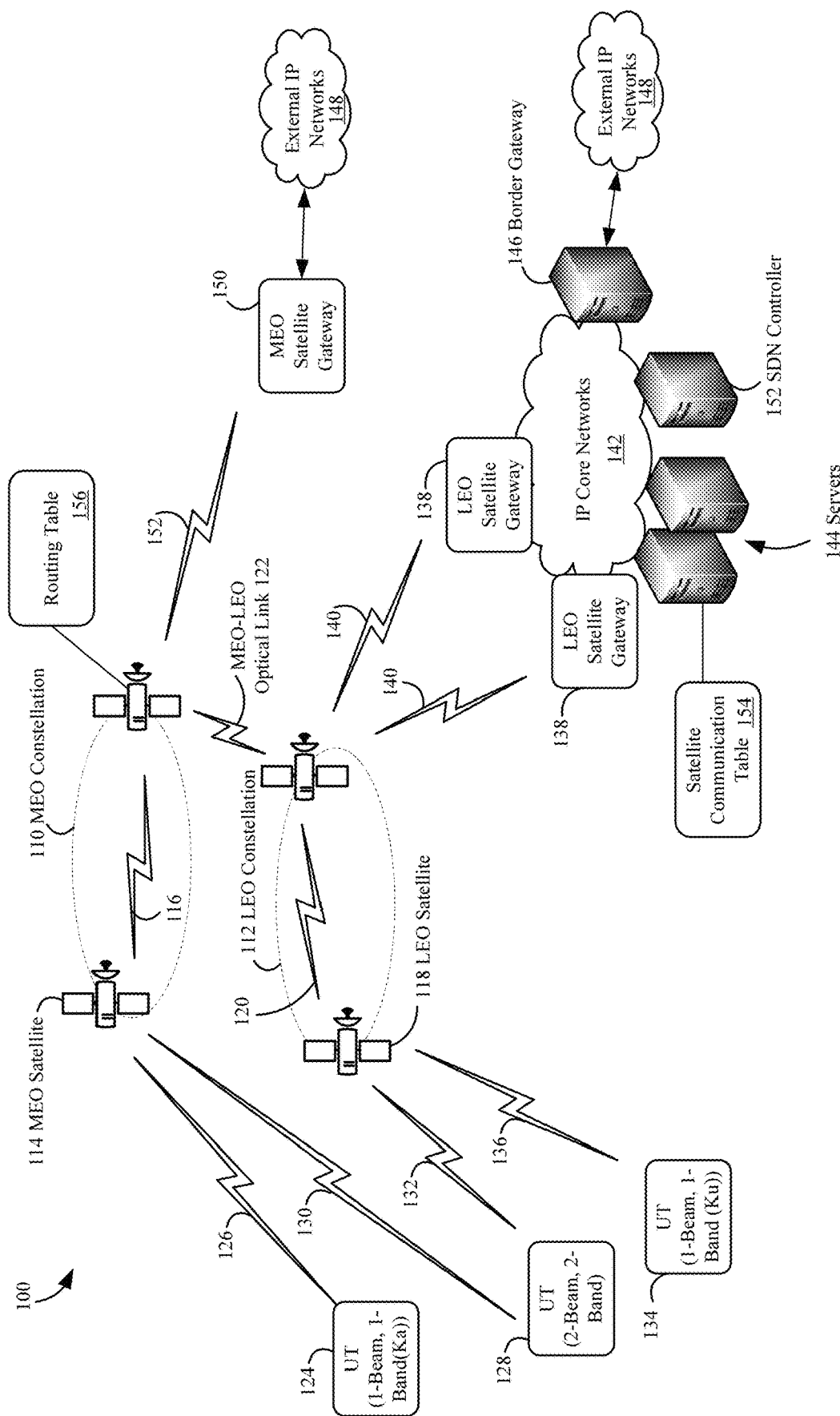
FIG. 1 is a diagram showing an example implementation of the MEO-LEO system according to the instant disclosure.

FIG. 1 is a diagram showing an example implementation of the MEO-LEO system 100 according to the instant disclosure. The specific implementation shown in FIG. 1 is just one possible implementation of a MEO-LEO system according to the instant disclosure. Other implementations may include additional components and/or a different number of components than those shown in FIG. 1. The example implementation of the MEO-LEO system 100 shown in FIG. 1 includes a MEO constellation 110 and a LEO constellation 112. The MEO constellation 110 has a number of MEO satellites 114. The MEO satellites 114 may be interconnected by MEO links 116 between the satellites as described further below. Similarly, the LEO constellation 112 has a number of LEO satellites 118 interconnected by LEO links 120 between the LEO satellites 118. The MEO links 116 and the LEO links 120 may be optical links or RF links. The MEO constellation 110 and the LEO constellation 112 may have any number of satellites as described further below.

The MEO-LEO system 100 further includes a number of user terminals (UT) that communicate with the MEO satellites 114 and the LEO satellites 118. A first user terminal 124 communicates over a single beam 126, on a single Ka band, to the MEO satellites 114. A second user terminal 128 communicates with two beams 130, 132 to the satellites. The first beam 130 is on the Ka band and communicates with the MEO satellites 114. The second beam 132 is on the Ku band and communicates with the LEO satellites 118. A third user terminal 134 communicates over a single beam 136 with a single, Ku band, to the LEO satellites 118.

Referring again to FIG. 1, the MEO-LEO system 100 may include a number of satellite gateways that also communicate with the satellites. LEO satellite gateways 138 may communicate with LEO satellites 118 over one or more beams and one or more bands. In the illustrated examples, the LEO gateways 138 communicate with the LEO satellites 118 over a combination of Ka and Q/V bands 140. The LEO satellite gateways 138 communicate over an internet protocol (IP) core network 142 with one or more servers 144. The servers 144 may include subscription, security, management and application servers. The IP core network 142 may also include a border gateway 146 for connecting to external IP networks 148. MEO satellite gateways 150 may communicate with MEO satellites 114 over one or more beams and one or more bands. In the illustrated examples, the MEO gateways 150 communicate with the MEO satellites 114 over a combination of Ka, Q/V, and E bands 152.

The MEO-LEO system 100 may further include a software defined network (SDN) controller 152. The SDN controller 152 in the example MEO-LEO system 100 shown in FIG. 1 is located on the IP core network 142. Alternatively, the SDN controller 152 may be located within the satellite gateways 138, 150. Since power on a satellite is limited, it is desirable to put the SDN controller function on the ground where power is more readily available. Placing the complex SDN controller function on the ground also allows for a simplified router on the satellite where the satellite router simply routes the data according to instructions received from the SDN controller 152. The SDN controller 152 receives information about conditions of the various links in the MEO-LEO system 100 and calculates a route for data through the system based on the condition of the links. Examples of the MEO-LEO links and routing through these links are described further below. The satellite system 100 may further include a satellite communication table 154 connected to a server 144 for storing user terminal connection data as described further below. In addition, the satellites 114, 118 may also include a routing table 156 as described below.

In some implementations, the MEO-LEO system 100 may provide hot spot coverage. As used herein, hot spot coverage means that there are certain regions in the coverage area where there is a significantly higher demand compared to other regions and the system provides the capability to allocate commensurate satellite resources (frequency and power) to satisfy the demand.

Figure 2:
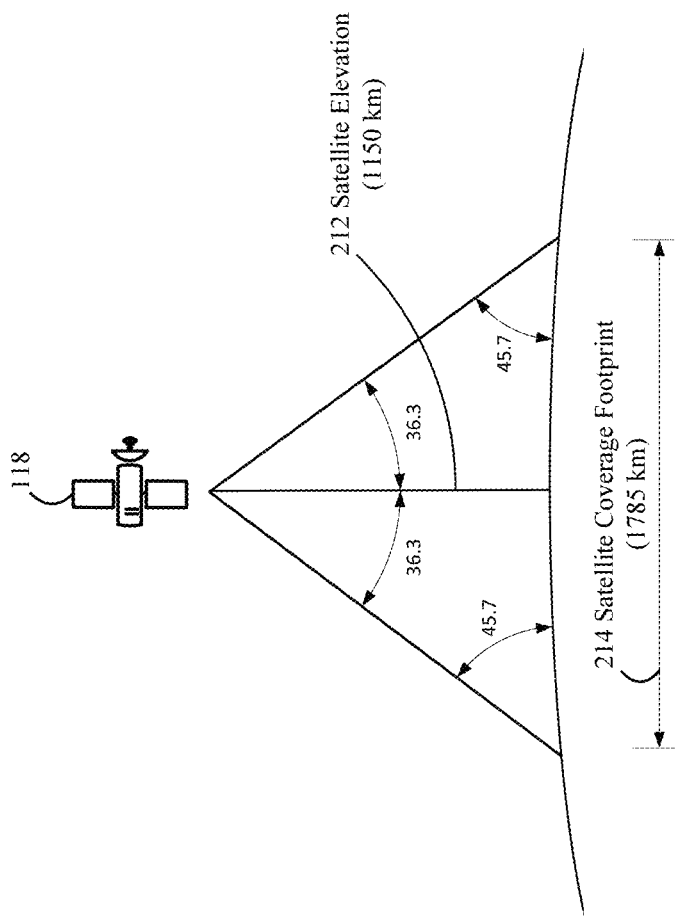
FIG. 2 shows LEO constellation parameters for an example constellation with 864 satellites.

FIG. 2 shows LEO constellation parameters for an example constellation with 864 LEO satellites. In this example, the LEO satellites 118 have a satellite elevation 212 of 1150 km. This satellite elevation 212 provides a satellite coverage footprint 214 of 1785 km on the earth's surface. The constellation Height is 1150 km with 36 planes and 24 satellites per plane. The minimum UT Elevation is 45.7 degrees. However, with a phased array antenna, it is also possible to cover Alaska (up to 71.2° N) with satellite steering of 52.76° to allow user terminals in Alaska to operate at elevation angles of ~20 degrees with parabolic dishes even with partial constellation. The satellites 118 include a Ku user link and one or more Ka and V/Q Gateway links. The user link uses a phased array antenna. Each satellite 118 includes optical inter-satellite links as described further below. Both left hand circular polarization (LHCP) and right hand circular polarization (RHCP) may be used in user links and Gateway Links. The satellites 118 have 16 GHz user spectrum per satellite providing 32 Gbps per satellite. The user data rate in the forward link is 1 Gbps per 500 MHz channel. As used herein, a plane is a specific orbit in which one or more satellites revolve around the earth. A plane is typically identified by altitude, inclination, longitude of ascending node etc.

Table 1 summarizes some representative LEO system parameters for the example LEO constellation 112 shown in FIG. 1.

TABLE 1

| Attribute | LEO Constellation | Notes |
| --- | --- | --- |
| Orbit | Inclined 55 degrees | Targeted coverage +/− 55 deg latitude |
| Height | 1150 km | |
| Beams | Phased array | Phased array provides flexible coverage |
| Foot-print | Earth-fixed and satellite fixed | Hot-spots, high bandwidth options |
| Transponder | Digital processing | Improved throughputs, facilitate routing |
| ISL | Yes | In-plane cross-link, MEO-LEO cross link |
| User link polarization | Both polarizations | Improved capacity and density |
| Bandwidth-Forward Beam | Up to 4 GHz | 2 GHz per polarization |
| Capacity Density | High | Result of constellation and phased arrays |
| Waveform | DVB-S2X/LDPC | Stronger link, more efficient |
| Switching, management Protocols | 5G | Better QoS handling, Multiple RAT |
| Total Satellites | Up to 1440 | |
| Gateway antenna size | 3.0 m | |
| User antenna size | 40 cm to 1.2 m | |
| Capacity Density (Max) | 2.6 Mbps/sq-km | |

Figure 3:
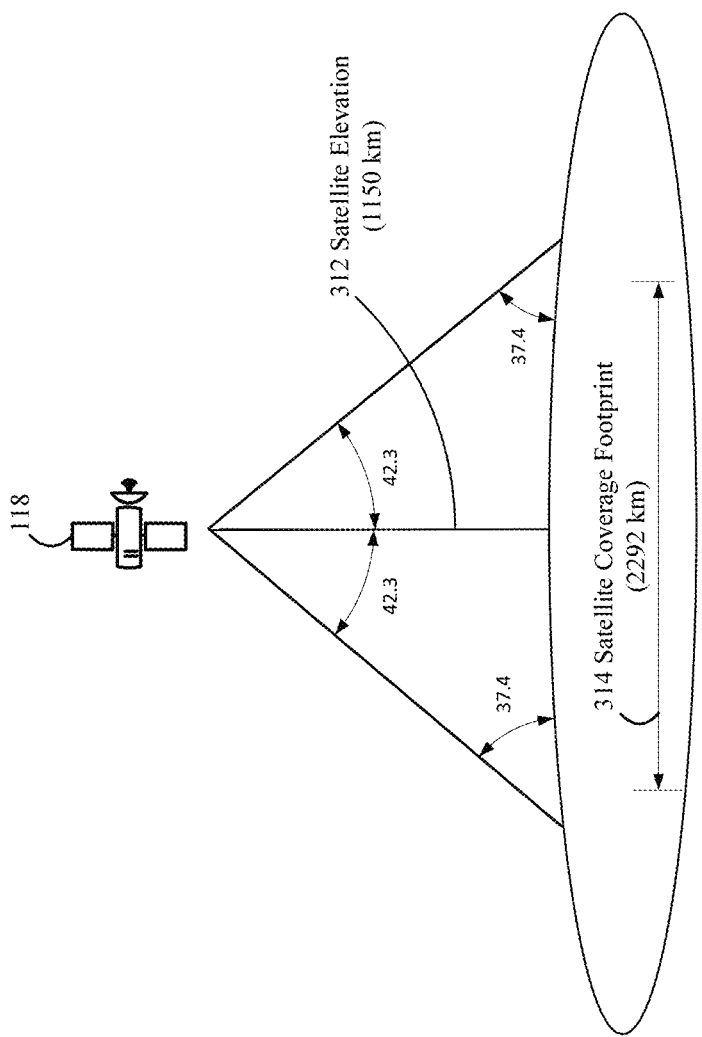
FIG. 3 shows LEO constellation parameters for an example constellation with 432 satellites.

FIG. 3 shows representative LEO constellation parameters for an example constellation with 432 LEO satellites. In this example, the LEO satellites 118 have a satellite elevation 312 of 1150 km. This satellite elevation 312 provides a satellite coverage footprint 314 of 2292 km on the earth's surface. The constellation Height is 1150 km with 18 planes and 24 satellites per plane. The minimum UT Elevation is 37.4 degrees. However, with a phased array antenna, it is also possible to cover Alaska (up to 71.2° N) with satellite steering of 53.6° to allow user terminals in Alaska to operate at elevation angles of ~18 degrees with parabolic dishes even with partial constellation. The satellites 118 include a Ku user link and one or more Ka and V/Q Gateway links. The user link uses a phased array antenna. Each satellite 118 includes optical inter-satellite links as described further below. Both LHCP and RHCP in user links and Gateway Links. The satellites 118 have 16 GHz user spectrum per satellite providing 32 Gbps per satellite. The user data rate in the forward link is 1 Gbps per 500 MHz channel.

Table 2 summarizes some representative MEO system parameters for the example MEO constellation 110 shown in FIG. 3.

TABLE 2

| Attribute | MEO Constellation | Notes |
| --- | --- | --- |
| Orbit | Inclined 55 degrees | Targeted coverage +/− 55 deg latitude |
| Height | 8000 km | |
| Beams | Phased array | Phased array provides flexible coverage |
| Foot-print | Earth-fixed | Hot-spots, high bandwidth options |
| Transponder | Digital processing | Improved throughputs, routing |
| ISL | Yes | In-plane cross-link, MEO-LEO cross link |
| User link polarization | Both polarizations | Improved capacity and density |
| Bandwidth - Forward Beam | Up to 4 GHz | 2 GHz per polarization |
| Capacity Density | Very High | Result of constellation and phased arrays |
| Waveform | DVB-S2X/LDPC | Stronger link, more efficient |
| Switching, management Protocols | 5G | Better QoS handling, Multiple RAT |
| Total Number of Satellites | 64 | |
| Gateway antenna size | 3.0 m | |
| User antenna size | 1.2 m, 21.5 dB/K | Can use smaller antenna with capacity loss |
| Capacity Density (Max) | 400 kbps/km^2 | Max over 30,000 km^2 |

Ground System deployment may be incremental based on user traffic demand. Gateways may be placed in areas where coverage is required. Inter-satellite links may be used for the backhaul. Another technical benefit of the MEO-LEO satellite system is that MEO requires fewer gateways. For example, 6-8 gateways may be sufficient for global coverage.

Figure 4:
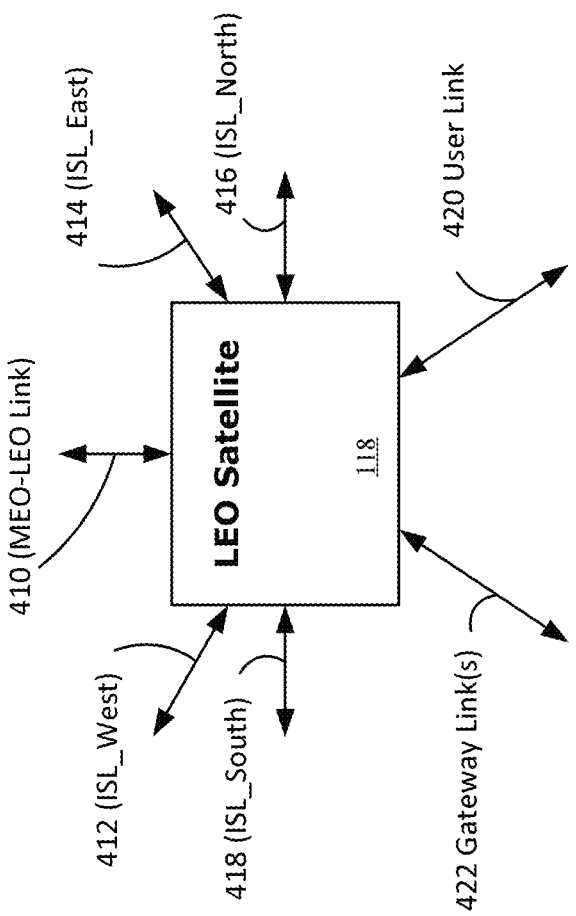
FIG. 4 shows an example of a LEO satellite that may be used with the techniques of the instant application.

FIG. 4 shows an example of the LEO satellite 118 described above in the LEO constellation 112. The LEO satellite 118 in this example is configured with link hardware to support five Inter-Satellite Links (ISLs) to adjacent LEO satellites. The ISLs are preferably optical links. The ISLs include a MEO-LEO optical link 410 that connects the LEO satellite 118 to a MEO satellite 114 in the MEO constellation 110 as shown in FIG. 1. The MEO-LEO optical link 410 is preferably a high bandwidth to provide backhaul to LEO satellites. As used herein, "backhaul" refers to a network connection transmitting a signal from a remote site or network to another site or network. The LEO satellite 118 includes east and west optical links (ISL-East 414, ISL-West 412) that connect the satellite 118 to adjacent satellites in adjacent planes to the east and west respectively. The LEO satellite 118 further includes north and south optical links (ISL-North 416, ISL-South 418) that connect to adjacent satellites in the same plane to the north and south. The LEO satellite 118 further includes a user link 420 and gateway links 422. The user link 420 includes a Ku-band phased array user link antenna. In this example, the gateway links include two Ka-band and a Q/V band gateway links for backhaul. The Ku antenna can also link backhaul traffic to a gateway if needed. In this example, the total Ku-band RF transmit power 80 Watts.

Figure 5:
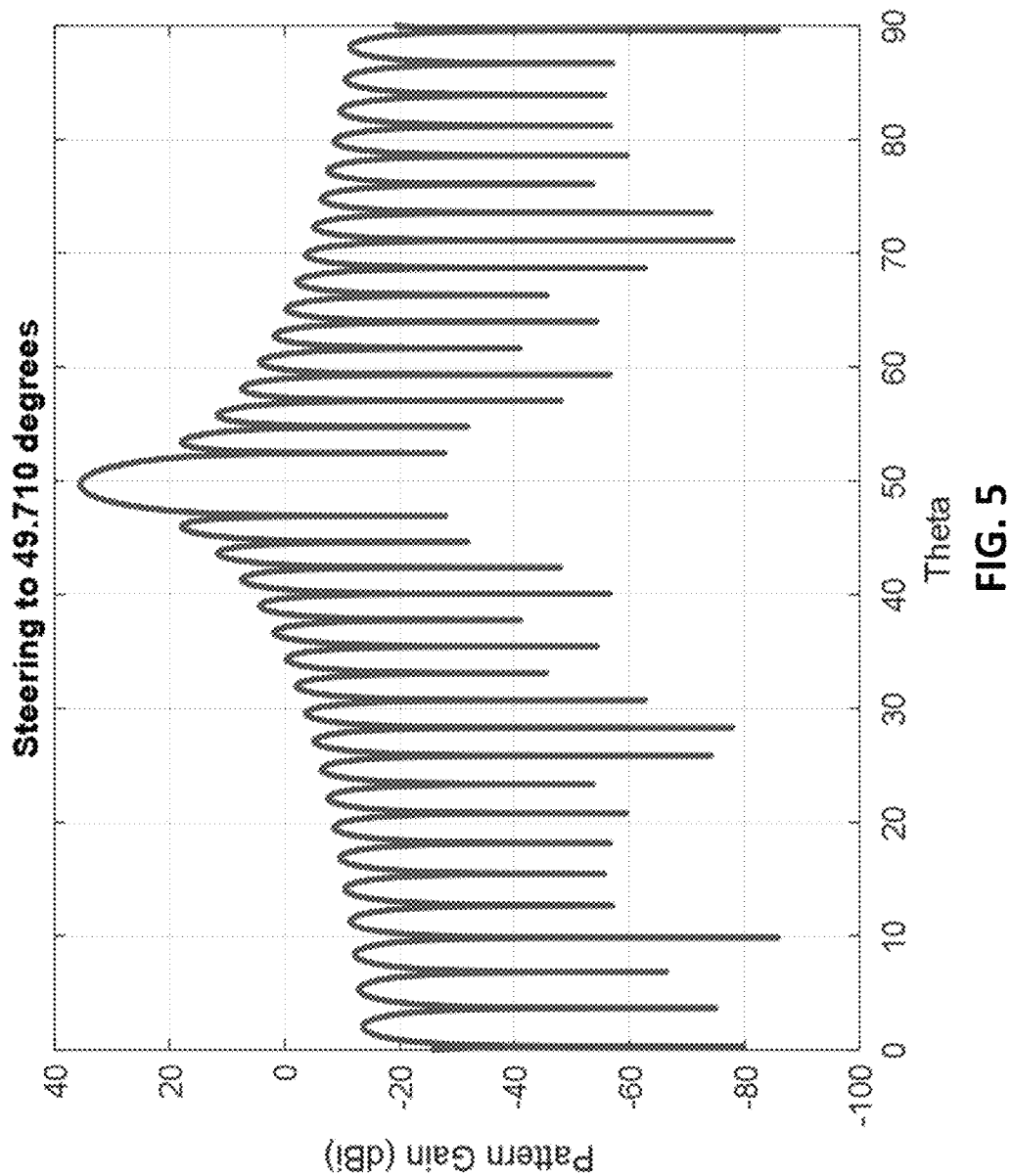
FIG. 5 is a diagram showing the LEO Gateway Link Antenna Pattern Using Bessel Function (ES Elev. 25 degrees).

FIG. 5 is a diagram showing the LEO gateway link antenna pattern using Bessel Function (ES Elev. 25 degrees). The gateway link antenna provides beam steering to 49.710 degrees.

Figure 6:
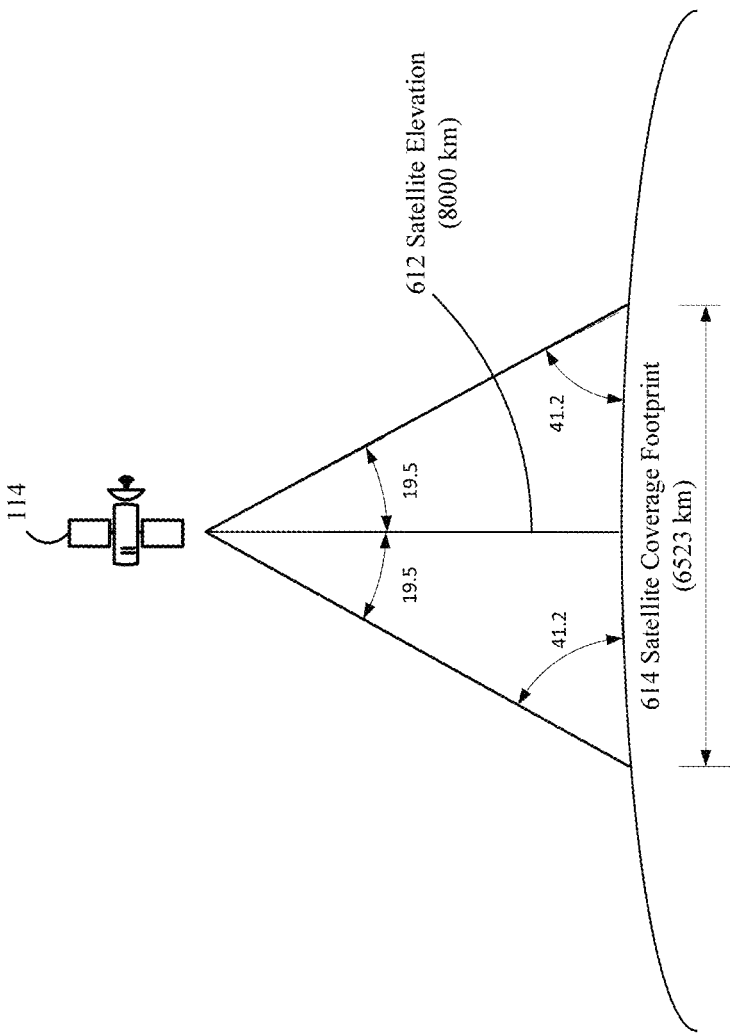
FIG. 6 shows MEO constellation parameters for an example constellation satellite.

FIG. 6 shows MEO constellation parameters for an example MEO constellation with 64 MEO satellites 114. In this example, the MEO satellites 114 have a satellite elevation 612 of 8000 km. This satellite elevation 612 provides a satellite coverage footprint 614 of 6523 km on the earth's surface. The constellation has 8 planes with 8 satellites per plane. The minimum UT Elevation is 41.2 degrees. Like the LEO satellites described above, the MEO satellite 114 can use satellite steering to cover further north to Alaska. The satellites 118 include a Ka band user link and one or more Ka, V/Q and E gateway links. The user link uses a phased array antenna. Each satellite 114 includes optical intersatellite links as described further below. Both LHCP and RHCP are used in the user links and gateway links. The satellites 114 have 48 GHz user spectrum per satellite providing about 100 Gbps per satellite.

Figure 7:
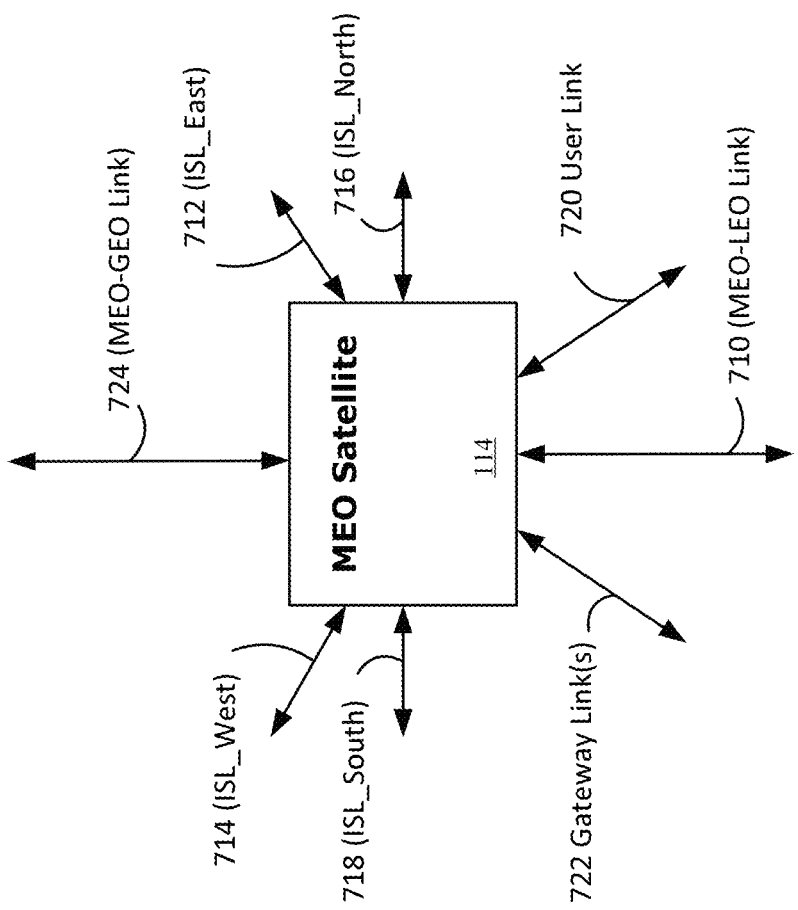
FIG. 7 shows an example of a MEO satellite that may be used with the techniques of the instant application.

FIG. 7 shows an example of the MEO satellite 114 described above in the MEO constellation 110. The MEO satellite 114 in this example includes six ISLs to adjacent LEO satellites. The ISLs include a MEO-LEO optical link 710 that connects the satellite 114 to an LEO satellite 118 in the LEO constellation 112 as shown in FIG. 1. The MEO-LEO optical link 710 is preferably a high bandwidth to provide backhaul to LEO satellites. The MEO satellite 114 includes east and west optical links (ISL-East 712, ISL-West 714) that connect the satellite 114 to adjacent satellites in adjacent planes to the east and west respectively. The MEO satellite 114 further includes north and south optical links (ISL-North 716, ISL-South 718) that connect to adjacent satellites in the same plane to the north and south. The MEO satellite 114 further includes a user link 720 and gateway links 722. The user link 720 includes a Ka-band user link with a phased array antenna. In this example, the gateway links include four Ka-band and a Q/V band gateway links for backhaul. The Ka antenna can also link backhaul traffic to a gateway if needed. In this example, the total Ka-band RF transmit power 100 Watts. The MEO satellite 114 may further include a MEO-GEO link 724 to a geosynchronous satellite. The MEO-GEO link 724 may be an optical link similar to the MEO-LEO optical link 710 disposed on the satellite facing geosynchronous satellite located above the MEO satellite 114.

Figure 8:
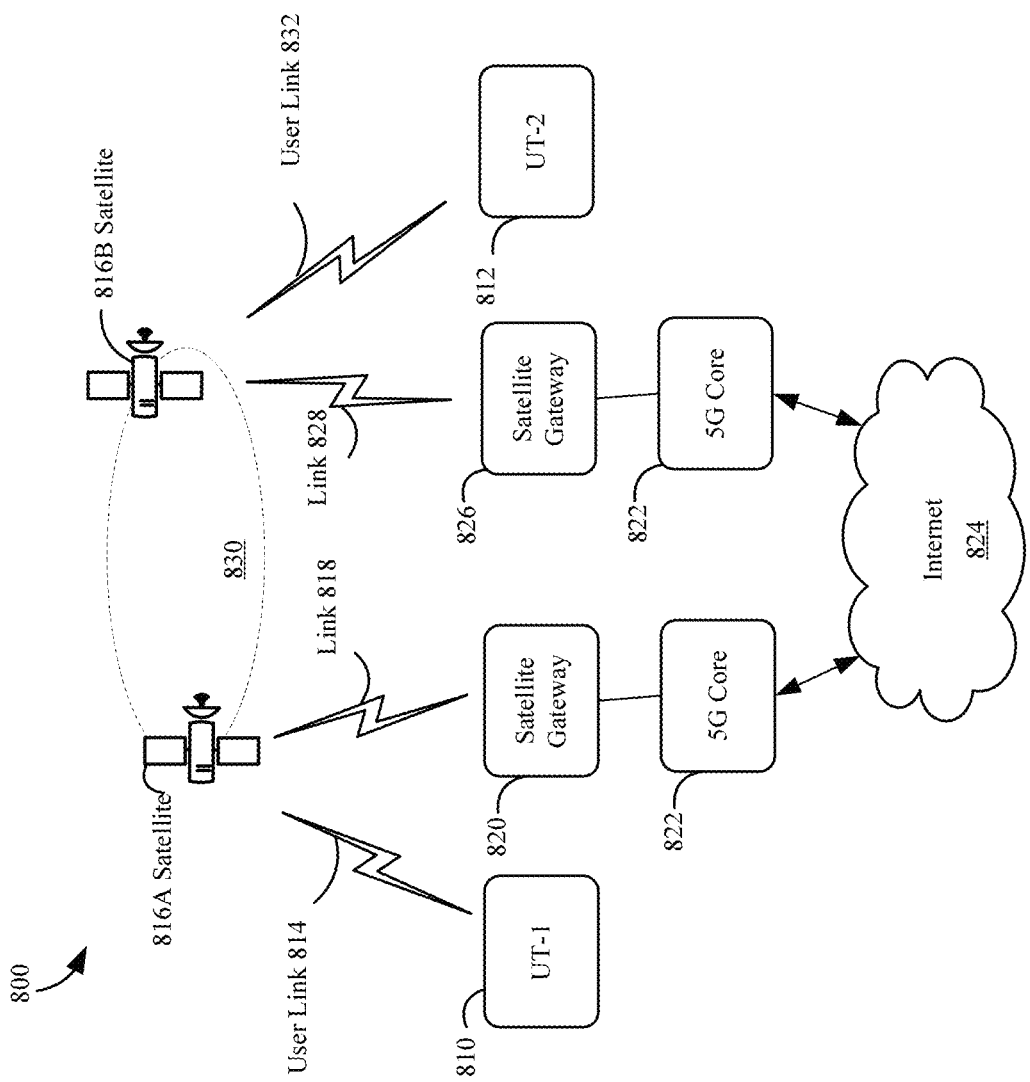
FIG. 8 illustrates a satellite communication system according to the prior art.

FIG. 8 shows a satellite communication system 800 which illustrates prior art communication in a satellite system. A first user terminal (UT-1) 810 connects to and communicates with a second user terminal 812 through the satellite system 800 and terrestrial network. The satellite system may have one or more satellites shown here as satellite 816A and 816B and collectively referred to as satellites 816. The first user terminal 810 connects via a user link 814 to a first satellite 816A. The first satellite 816A communicates with a first satellite gateway 820 over a link 818. The first satellite gateway 820 sends data through a terrestrial network to a second satellite gateway 826. In this example, the first satellite gateway 820 communicates with a 5G core network 822 to the internet 824. Data is sent over the internet 824 through the 5G core network 822 to the second satellite gateway 826. The second satellite gateway 826 send the data over a second link 828 to satellite 816B. The second satellite 816B then sends the data to the second user terminal (UT-2) 812 over a user link 832. The user links 832, 814 may be similar to user links 132, 136 as described above with reference to FIG. 1. The satellites 816A, 816B may be the same satellite or different satellites in either an LEO or MEO constellation but not both.

In the prior art, as shown in FIG. 8, packets originating from a first user terminal (UT-1) under one satellite are brought down to a corresponding gateway on the ground and routed on terrestrial links to a second gateway under a satellite (the same satellite or a different satellite in the same or a different constellation) that is connected to a second user terminal (UT-2). Traditional non-geostationary constellations are either at LEO or MEO. LEO and MEO constellations can have intra-constellation optical or RF cross-links. The described implementations herein provide interconnected LEO and MEO satellites with cross-links not just within a constellation but also between LEO and MEO constellations. LEO and MEO constellations can advantageously be using different frequency bands in user links. For example, Ku band for LEO and Ka band for MEO. A given user terminal may be capable of Ku only, Ka only or both Ku and Ka. In implementations herein, two user terminals may directly communicate with each other regardless of their band capabilities. Direct communication between two user terminals without touching the ground has the significant advantage of providing the highest security. As described herein, packets originating from a first UT under one constellation can be routed to a second UT under a different constellation entirely in the constellation without being routed on any terrestrial networks.

Figure 9:
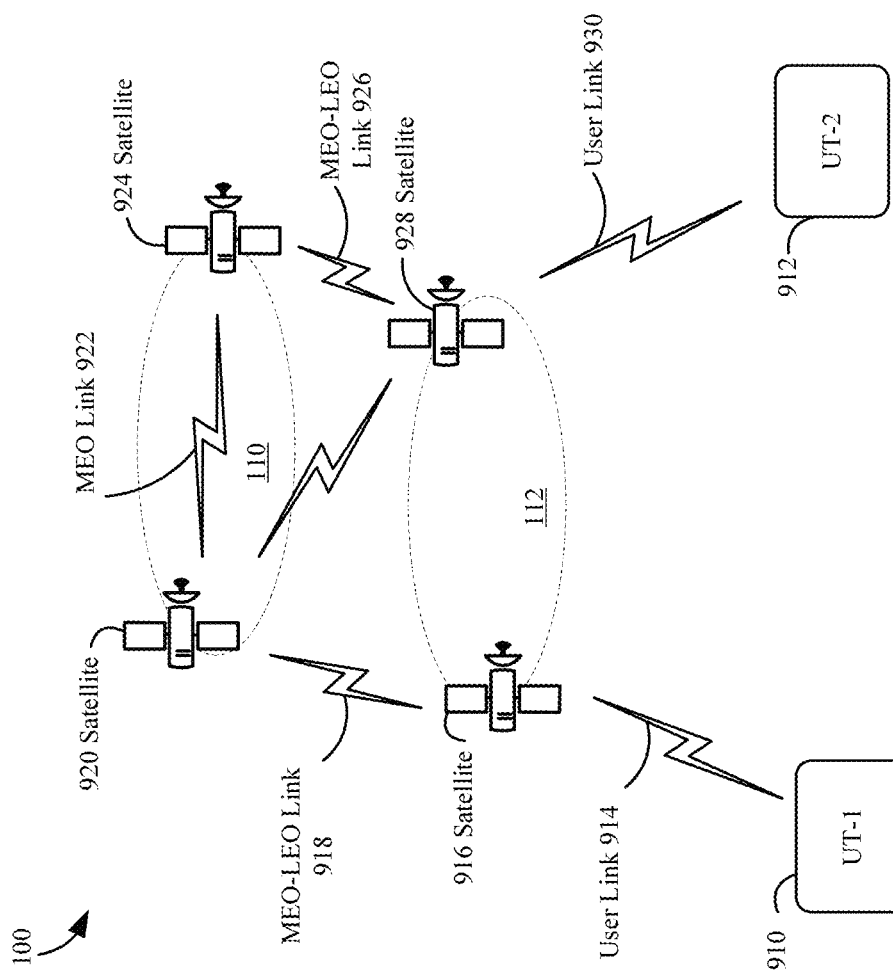
FIG. 9 is a diagram showing a first scenario for UT-UT connectivity.
Figure 10:
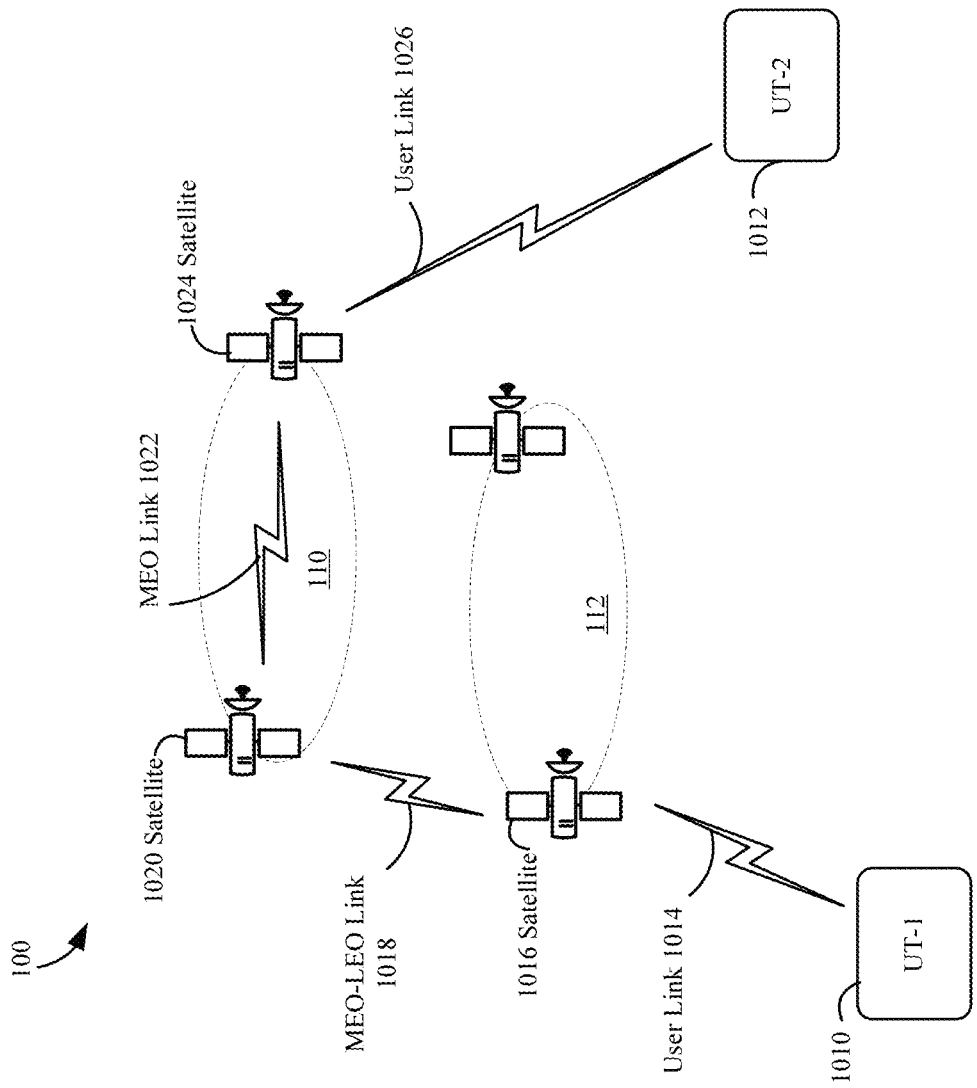
FIG. 10 is a diagram showing a second scenario for UT-UT connectivity.

FIGS. 9 and 10 illustrate two examples for data connectivity between user terminals without traversing terrestrial links. Many entities such as governments, businesses, or other enterprises may benefit from a point-to-point secure data link. A data link that does not traverse terrestrial data links reduces exposure to security risks of terrestrial links that are not controlled by the entity.

FIG. 9 presents a first example of point-to-point connectivity between user terminals without traversing terrestrial links. A first user terminal (UT-1) 910 connects to and communicates with a second user terminal (UT-2) 912 through the MEO-LEO system 100. The user terminals 910, 912 may be physically located at virtually any point on the surface of the Earth. The first user terminal 910 connects via a user link 914 to a LEO satellite 916. The user link 914 may be similar to user links 132, 136 as described above with reference to FIG. 1. The LEO satellite 916 is a satellite in the LEO constellation 112. The LEO satellite 916 communicates over a MEO-LEO link 918 with a MEO satellite 920 in the MEO constellation 110. In a first example, the MEO satellite 920 communicates over a MEO link 922 to a second MEO satellite 924. The second MEO satellite 924 communicates over another MEO-LEO link 926 to a LEO satellite 928. The LEO satellite 928 the communicates over a user link 930 with the second user terminal 912. Alternatively, in a second example, the first MEO satellite 920 may communicate directly with the LEO satellite 928, thus not needing the MEO link 922.

FIG. 10 is a diagram showing a second scenario for connectivity between user terminals. A first user terminal (UT-1) 1010 connects to and communicates with a second user terminal (UT-2) 1012 through the MEO-LEO system 100. The user terminals 1010, 1012 may be physically located at virtually any point on the surface of the Earth. The first user terminal 1010 connects via a user link 1014 to a LEO satellite 1016. The user link may be user links 132, 136 as described with reference to FIG. 1. The LEO satellite 1016 is a satellite in the LEO constellation 112. The LEO satellite 1016 communicates over a MEO-LEO link 1018 with a MEO satellite 1020 in the MEO constellation 110. In this example, the MEO satellite 1020 communicates over a MEO link 1022 to a second MEO satellite 1024. The second MEO satellite 1024 communicates over a user link 1026 with the second user terminal 1012.

The MEO-LEO system architecture lends itself to providing high availability and secure communication between two points on the earth without traversing terrestrial links. Software Defined Networking (SDN) based routing will allow appropriate routing via the MEO-LEO constellation to reach the intended destination. It is noted that the data path between two user devices does not go through a gateway link and therefore does not traverse any terrestrial link or facility. Although the illustration shows communication between two entities that are both Ku-band terminals, it is also possible for this type of secure connectivity between a Ku-band and Ka-band terminal. In such a case, the Ka link will be with MEO and Ku link will be with LEO. A route determination algorithm can determine the most optimal route via intra- and/or inter-constellation links.

Figure 11:
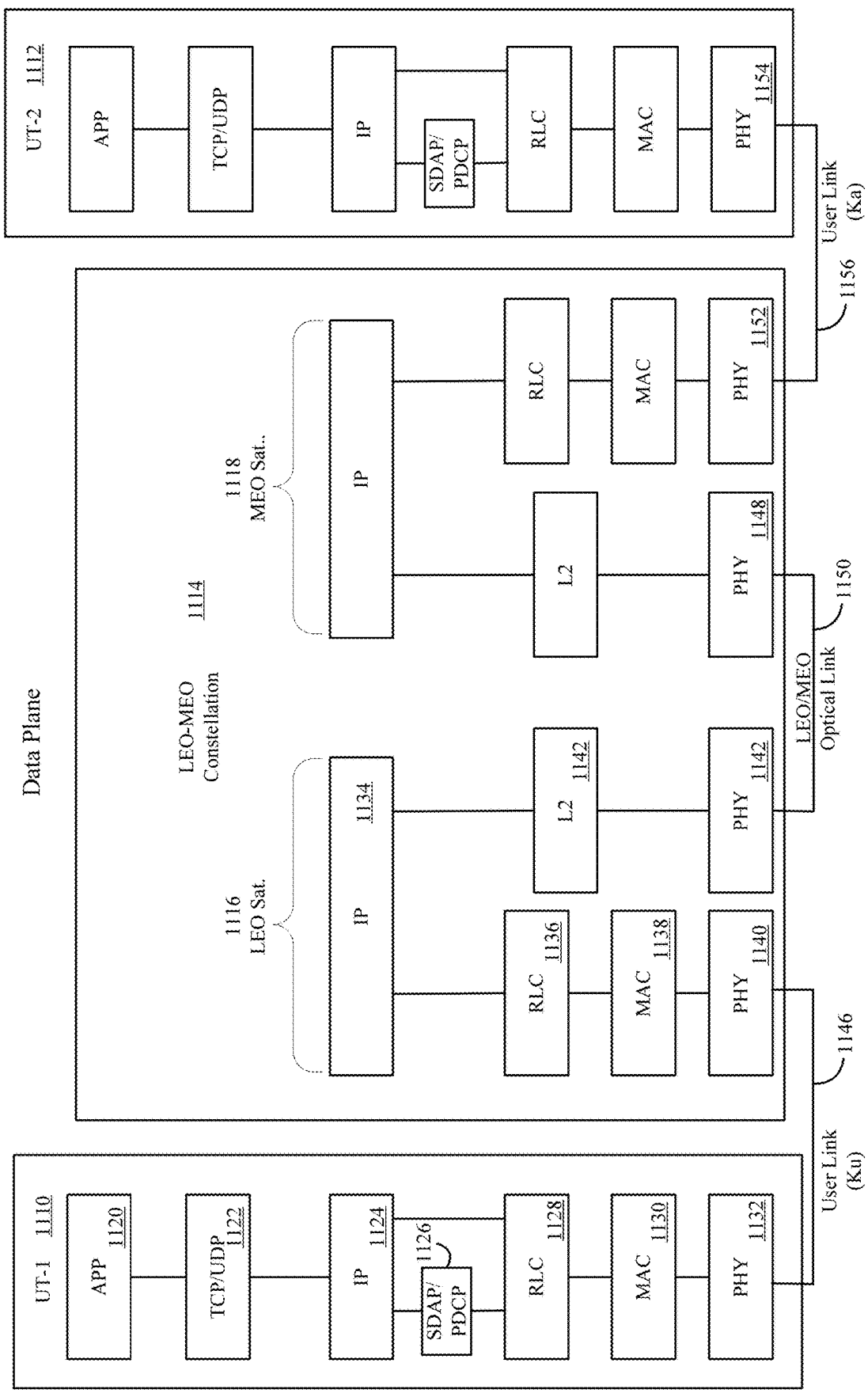
FIG. 11 illustrates an implementation of IP routing in a satellite system for secure UT to UT communication.

FIG. 11 illustrates an implementation of IP routing in a satellite system for secure UT to UT communication. FIG. 11 shows the data plane routing of the UT-UT communication. In this implementation, a first user terminal UT-1 1110 is connected to a second user terminal UT-2 1112 via a LEO-MEO constellation 1114 comprising an LEO satellite 1116 and an MEO satellite 1118. The first user terminal UT-1 1110 includes a representation of the user plane protocol stack. The user plane protocol stack includes from top to bottom, an application block 1120, a transmission control protocol/user datagram protocol (TCP/UDP) block 1122, an internet protocol (IP) block 1124, a service data adaption protocol/packet data convergence protocol block (SDAP/PDCP) block 1126, a radio link control (RLC) block 1128, a medium access control (MAC) block 1130 and a physical layer (PHY) block 1132. The second user terminal 1112 includes the same user plane protocol stack with these same blocks. Each of these blocks may function as known in the prior art. The LEO satellite 1116 also includes a representation of the user plane protocol stack. The user plane protocol stack in the LEO satellite 1116 includes an internet protocol (IP) block 1134, a radio link control (RLC) block 1136, a medium access control (MAC) block 1138 and a physical layer (PHY) block 1140, a layer 2 (L2) block 1142 and a second physical layer (PHY) block 1144. The MEO satellite 1118 has the same blocks in its user plane protocol stack.

Referring again to FIG. 11, the IP routing of UT to UT communication includes various links between the user terminals and the satellites. The PHY layer 1132 of the first user terminal 1110 is connected to the PHY layer 1140 of the LEO satellite 1116 via a user link 1146. In this example, the user link 1146 is a Ku band link. The PHY layer 1144 of the LEO satellite 1116 is connected to the PHY layer 1148 of the MEO satellite 1118 via a LEO/MEO optical link 1150 as described above. The PHY layer 1152 of the MEO satellite 1118 is connected to the PHY layer 1154 of the second user terminal 1112 via a second user link 1156. In this example, the user link 1156 is a Ka band link.

Figure 12:
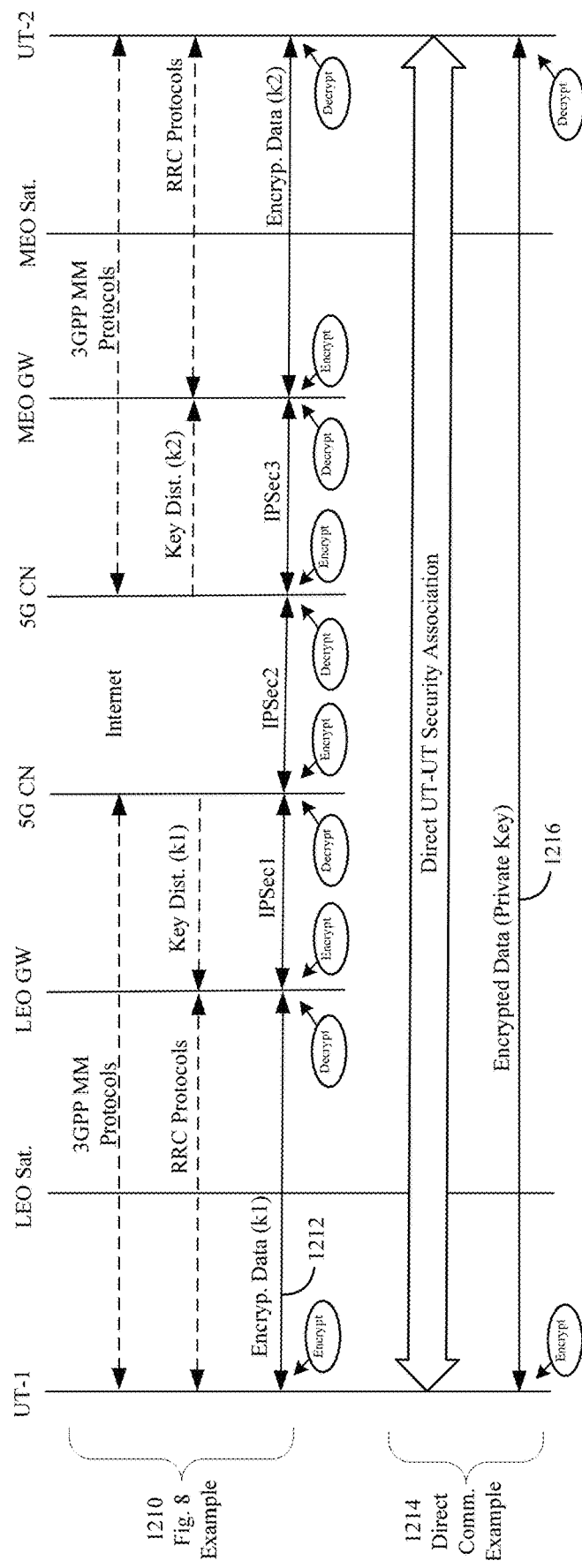
FIG. 12 is a data flow diagram for secure direct UT to UT communication in a satellite system.

FIG. 12 is a data flow diagram for secure direct UT to UT communication in a satellite system. FIG. 12 illustrates data flow from a first user terminal UT-1 to a second user terminal UT-2. Data passes from UT1 through the network entities as follows: UT-1-LEO satellite-LEO Gateway-5G Core Network-Internet-5G Core Network-MEO gateway-MEO satellite-UT-2. The top portion 1210 of the data flow diagram represents data flow in a satellite system as shown in FIG. 8. In this prior art data flow, encrypted data 1212 flowing from UT1 to UT2 undergoes encryption and decryption at each segment of the data path as shown. In contrast, the bottom portion 1214 of the data flow diagram represents direct UT-UT secure data flow in a satellite system as shown in FIGS. 9 and 10. As described herein, encrypted data 1216 flowing from UT-1 to UT-2 undergoes encryption at UT-1 and decryption at UT-2. The encrypted data 1216 flowing from UT-1 to UT-2 is secured using a private key which protects the data throughout the entire data route.

Figure 13A:
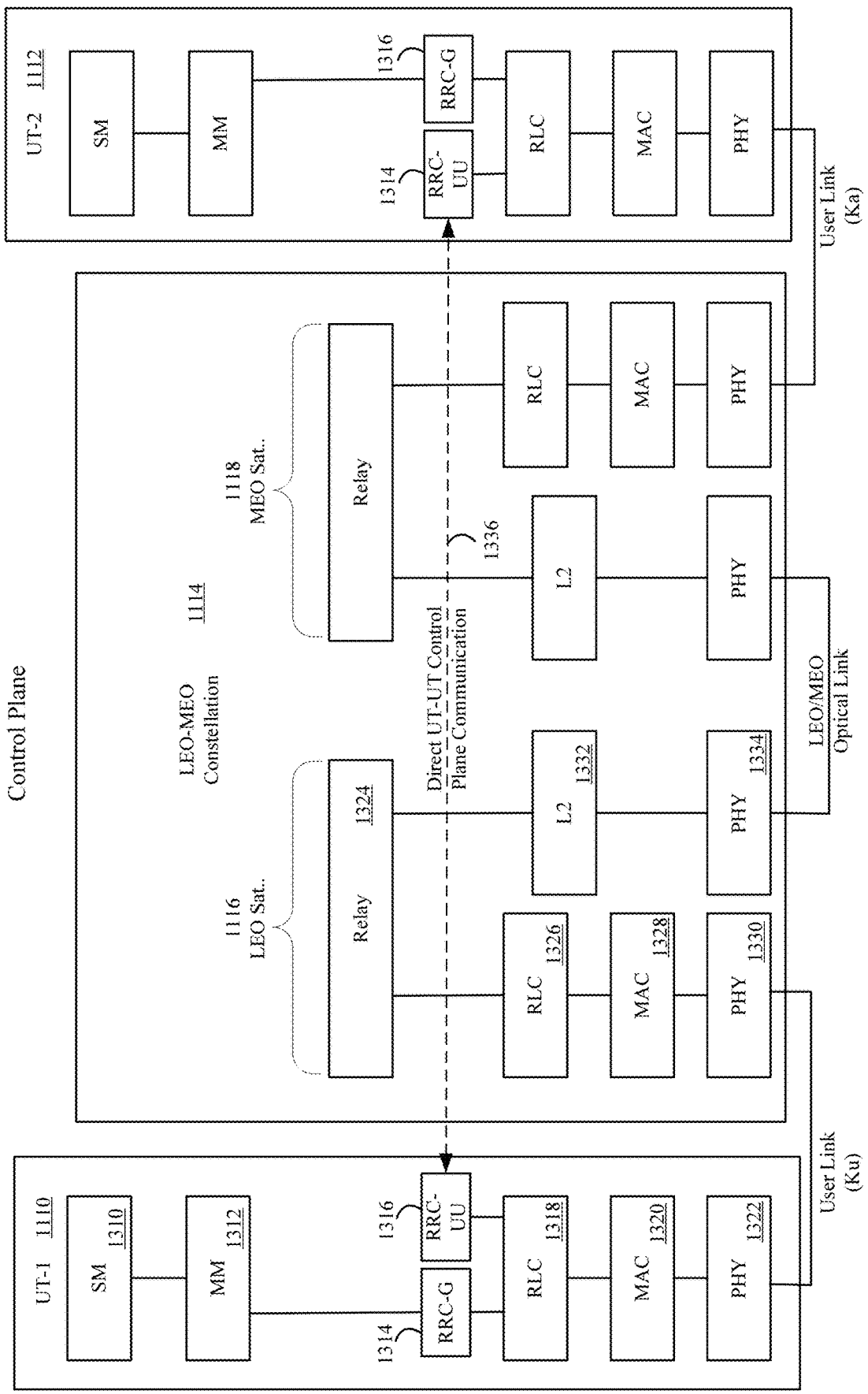
FIG. 13A illustrates an implementation of IP routing in a satellite system for secure UT to UT communication.

FIG. 13A illustrates an implementation of IP routing in a satellite system for secure UT to UT communication. FIG. 13 shows the control plane routing of the UT-UT communication for a system similar to that of FIG. 11. In this implementation, a first user terminal UT-1 1110 is connected to a second user terminal UT-2 1112 via a LEO-MEO constellation 1114 comprising an LEO satellite 1116 and an MEO satellite 1118. The first user terminal 1110 includes a representation of the control plane protocol stack. The control plane protocol stack includes from top to bottom, an NAS-MM block 1310, an NAS-MM block 1312, a radio resource control gateway (RRC-G) block 1314, a radio resource control user-user (RRC-UU) block 1316, a radio link control (RLC) block 1318, a medium access control (MAC) block 1320 and a physical layer (PHY) block 1322. The second user terminal 1112 includes the same control plane protocol stack with these same blocks. Each of these blocks, with the exception of RRC-UU 1316, may function as known in the prior art. The LEO satellite 1116 also includes a representation of the control plane protocol stack. The control plane protocol stack in the LEO satellite 1116 includes a relay block 1324, a radio link control (RLC) block 1326, a medium access control (MAC) block 1328 and a physical layer (PHY) block 1330, a L2 block 1332 and a second physical layer (PHY) 1334. The MEO satellite 1118 has the same blocks in its user plane protocol stack. The RRC-UU block 316 allows direct UT-UT control plane communication 1336 between the two user terminals as described further below.

An advantage of some implementations herein is direct communication between user terminals as introduced above. For example, a direct connection can be achieved between a first user terminal that can communicate with an LEO satellite and a second user terminal that can communicate with MEO satellite, or other routes through a satellite constellation as described above. A user terminal can initiate direct communication by knowing the IP address of another user terminal. IP packets transmitted by the first user terminal are received by the first satellite, for example an LEO-SAT. The RLC layer in the first user satellite may implement Layer-2 automatic repeat (ARQ) protocols to ensure error free reception of IP packets at the LEO-SAT. Layer-2 ARQ may be selectively applied based on traffic flow characteristics. For example, TCP based traffic flows undergo Layer-2 ARQ. However, UDP based traffic flows such as conversational voice may not undergo Layer-2 ARQ. The satellite (LEO-SAT) may inspect the destination IP address in a received IP header and consults its routing table to determine the next-hop for this packet. Routing table in each satellite is updated based on link state information in the constellation topology. Traditional method would be for user terminals to advertise its reachability based on the satellite the user terminal is communicating with.

In a satellite system where the satellites are moving, i.e. a satellite constellation with non-geosynchronous satellites such as LEO and MEO satellites, user terminals need to update reachability information every time there is a satellite handover at the user terminal. Every time there is a reachability update of the user terminal to a new satellite, all other routers in constellation should update their routing tables to maintain reachability. Updating reachability information upon each handover can add significant signaling overhead in the system. In implementations described below, this signaling overhead can be completely removed where the satellites autonomously update their routing tables without explicit reachability update information. The user terminals can take advantage of satellite handover signaling protocols to piggy-back reachability information to the satellite. However, this method requires updating routing tables in each satellite. Using piggy-back protocols can put a significant demand on system resources due to the size of the routing table in each satellite. As an example, if there are hundreds of thousands of user terminals that wish to be engaged in direct sessions, the size of the routing tables will need to be quite large. In addition to memory requirements, the large routing table creates a demand for quick search over large routing tables.

To mitigate the issue of updating large routing tables, in some implementations, satellite routers don't have to store and search routing tables that are the size of the user terminal population. Instead, the routing table size is limited to the size of the constellation, namely the number of satellites in the constellation. When a user terminal intends to initiate a direct session with another user terminal, the first user terminal may be provided with the satellite ID that second user terminal is communicating with at the beginning of the communication session. This can be provided by the gateways. The LEO and MEO gateways are constantly aware of the geo-locations of the individual user terminals that having active communications. A designated server on the ground is aware of the LEO or MEO satellite that the second user terminal is in communication with. The designated server may be one of servers 144 with the data of user terminals which are communicating with a satellite stored in a satellite communication table 154 as shown in FIG. 1. This designated server provides the satellite ID that the second user terminal is communicating with at the beginning of the direct session—for the purposes of this discussion we call this as the egress satellite to reach the second satellite.

Figure 13B:
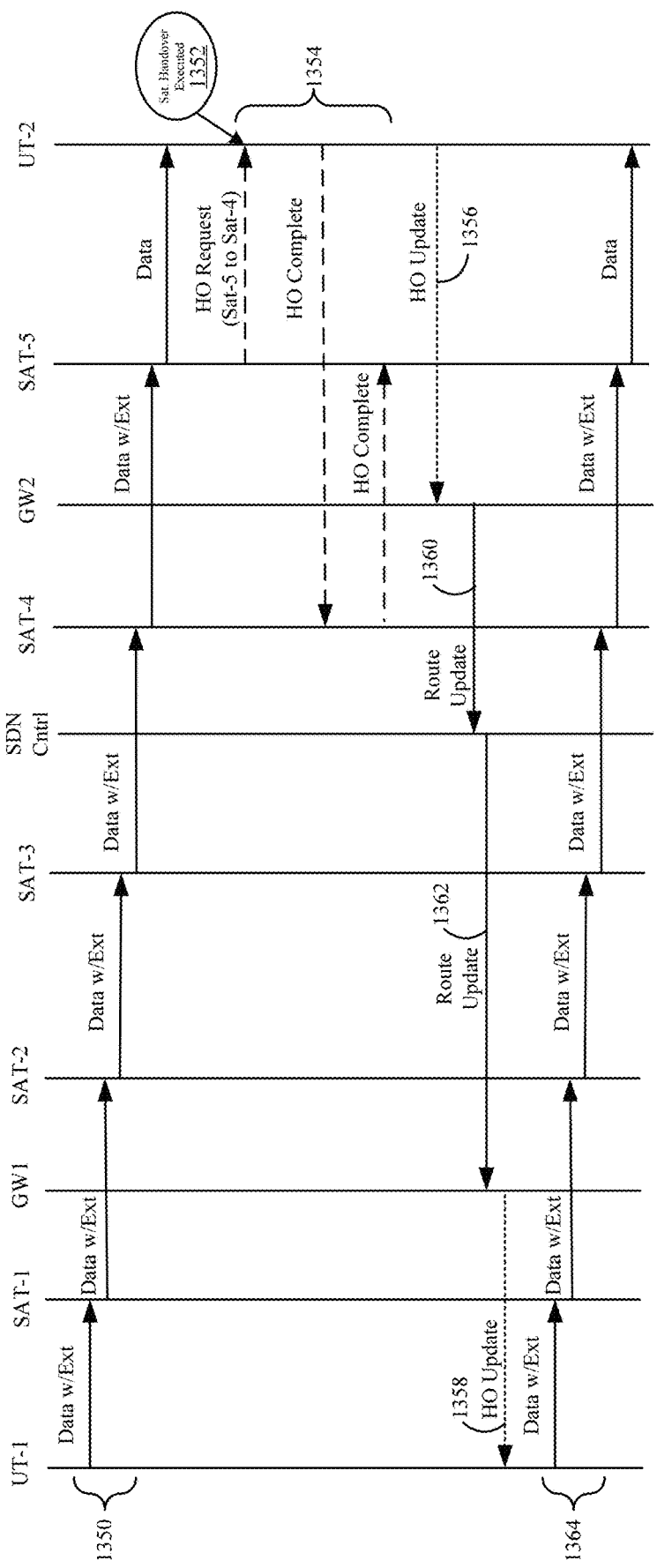
FIG. 13B illustrates a first example of direct communication between a first user terminal and a second user terminal.

FIG. 13B illustrates a first example of direct communication between a first user terminal and a second user terminal. In this implementation, the system uses extension IP headers to reduce the complexity and memory load required when using full routing tables as discussed above. Each IP data packet includes an extension IP header that contains the egress satellite's ID. Each entity in the system routes the data packet to the next entity based on the extension header of the data packet. Data may be sent through a combination of satellites and gateways to the destination user terminal. For example, data may use the point-to-point connectivity between user terminals without traversing terrestrial links as described with reference to FIG. 8 and FIG. 9. Alternatively, data may flow between user terminals using extension IP headers by passing through a combination of satellites and ground based gateways as shown in FIG. 13B.

In the illustrated example of FIG. 13B, a first user terminal UT-1 sends an IP packet destined to a second user terminal UT-2. UT-1 may inform UT-2 that it intends to communicate with UT-2 during security establishment handshake (not shown). The data communication using extension IP headers is illustrated as a data flow 1350 from UT-1 to UT-2. Data from UT-1 is first sent to SAT-1 with extension IP headers. SAT-1 receives the data IP packets from UT-1 with an extension header, and simply inspects the egress satellite ID to make a determination where to send the data on the next-hop to reach egress satellite ID. The data flow 1350 continues in this example by SAT-1 sending the data through gateway GW1 to SAT-2. In a like manner, the data flow 1350 continues through SAT-3, SAT-4 and SAT-5 to user terminal UT-2. The data may flow 1350 through other gateways and a software defined (SDN) controller as shown. Similarly, when UT-2 communicates with UT-1, the packets generated by UT-2 will have an extension header that points to the satellite UT-1 which is communicating with UT-2.

When a user terminal is no longer able to be serviced by a non-stationary satellite, a handover to another satellite takes place as described above. In the illustrated implementation, when a handover of UT-2 to a different satellite takes place, UT-2 directly informs UT-1 of the new satellite ID which is now handing data traffic of UT-2. Similarly, UT-1 informs UT-2 about its satellite handover. Whenever a user terminal receives new satellite information about a user terminal it is communicating with, the extension header is appropriately updated. In this way, the satellites do not need to maintain a large table with IP addresses, they only need to maintain a table to reach a particular satellite in the constellation. A brief description of a handover is shown in FIG. 13B. The handover may be accomplished with a sequence of handshake signals 1354. When a handover request is received, a satellite handover 1352 is executed. The handover handshake signals 1354 may end with handover complete signals as shown. After the handover is complete, the UT-2 sends a handover update to inform UT-1 of the new satellite ID it is communicating with. In this example, the handover update is accomplished using RRC-G signaling 1356 to gateway GW2. Router signaling 1360, 1362 can then be used to send the handover update to the next gateway GW1 via the SDN controller. RRC-G signaling 1358 can then be used to forward the handover update from GW1 to UT-1. UT-1, now having new satellite information about UT-2, updates the extension headers in data packets appropriately and again sends data 1364 to UT-2 as described above. This method of direct communication between user terminals eliminates the need for large routing tables. However, this method does require complex signaling via ground elements for the handover updates.

Figure 13C:
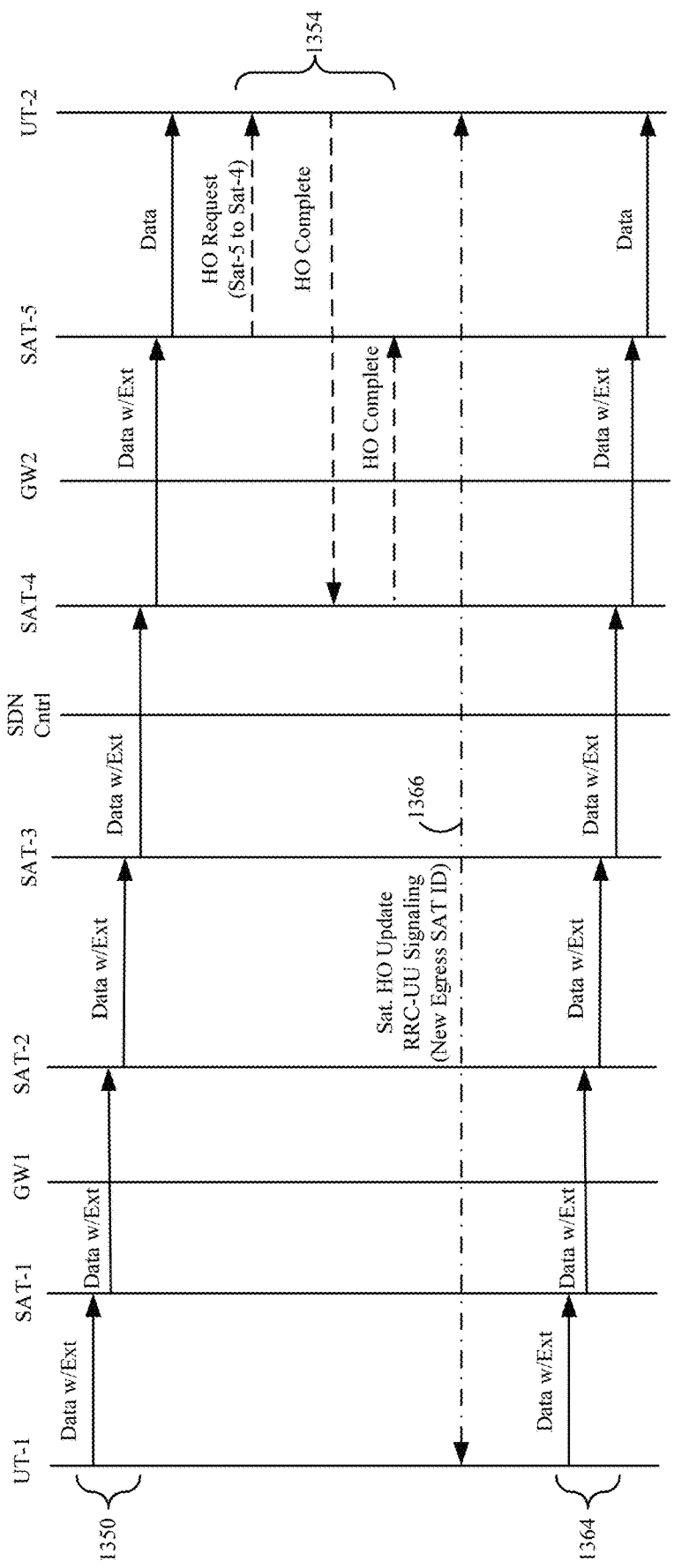
FIG. 13C illustrates a second example of direct communication between a first user terminal and a second user terminal.

FIG. 13C illustrates a second example of direct communication between a first user terminal and a second user terminal. In this example implementation, the system uses the RRC-UU 1316 introduced above for direct UT-UT control plane communication 1336 between the two user terminals. In this example, data flows 1350 from UT-1 to UT-2, and a handover is handled 1354 as described above. After the handover is complete, UT-2 communicates with UT-1 using RRC-UU layer protocol signaling 1366 to send UT-1 the new egress satellite ID used by UT-2. The RRC-UU layer protocol signaling 1366 uses the RRC-UU 1316 in the protocol stack of the user terminals as described above. UT-1 then uses the received information to update the egress router ID in the extension header for subsequent data sent 1364 to UT-2. Data is sent 1364 as described above where all satellites in the constellation only need to inspect the destination IP address in the extension header to route the packets to the correct egress router. Therefore, there is no need for routers to update their routing tables when a UT executes a satellite handover since it is the responsibility of UT to update the extension header. Further, since it is the user terminal's responsibility to populate the correct egress satellite ID in extension headers, the other satellites need not store information about individual user terminals.

It should be noted that once the packet reaches the intended egress satellite, the egress satellite must still determine the beam within the satellite where the user terminal can be reached. Each satellite maintains a list of active user terminals in each beam as part of normal radio resource function. Therefore, when a packet is received at the egress satellite, the satellite is aware of which beam the UT is located. Previous discussions were centered around constellation routing based on satellites inspecting destination IP address and extension headers. This implies that satellites have to implement IP layer and corresponding header checksum etc. This complexity can be eliminated taking advantage of the extension IP header concept discussed under IP Routing. Here the user terminal inserts an extension L2-header or a label that contains the egress satellite information rather than extension IP header. The first L2 frame of a given IP packet contains the extension L2 header. In this framework, the satellite does not need to implement IP layer. When the RLC layer completes the re-assembly, it simply inspects the extension L2-header of the first frame to route to egress satellite. This leads to a reduced complexity satellite implementation.

Paragraphs above describe efficient methods for routing in constellation with the aim of reduced complexity at individual satellites. This entailed the two user terminals to inform each other when it executes a satellite handover. Depending on the delay in communication between the two user terminals, it is possible that some packets are in transit with the old egress satellite ID. These packets will not reach the destination user terminal since the user terminal has completed handover to a new satellite. This can result in packet losses during satellite handover. To mitigate this and achieve lossless handover, implementations herein may incorporate a packet data convergence protocol (PDCP) Lite function in the individual user terminals. PDCP-Lite function introduces a sequence number to individual IP packets. When the destination UT PDCP-Lite layer finds a missing PDCP during handover, it requests the originating PDCP-Lite function to retransmit PDCP.

Implementations described above provide efficient techniques to establish direct UT-UT connection via LEO-LEO or LEO-MEO links. As described, the packets originate in one user terminal and reaches the destination UT without traversing through a ground network. In some systems, it may be required to know the volume of data (not the actual data itself) transferred during the direct UT-UT connection. For example, billing may require a determination of the volume of data sent. Another reason may be for traffic engineering. In an indirect UT-UT connection, this volume is easily determined by the 5G Core Network elements since all packets pass through the 5G Core. In the direct UT-UT connection approach described above, packets may not pass through the 5G core network elements. Two methods are introduced herein to address this issue of measuring the volume of data in a direct UT-UT connection. In the first method, the ingress satellite may simply replicate IP packets (or altered IP packets) towards the ground (and hence 5G core network); but destroy the content of the IP packet so that it makes no sense to a listener on the ground infrastructure. The 5G core network would simply compute volume based on these modified IP packets. However, this method consumes resources on the satellite as well as bandwidth. In a second method, the ingress satellite does the volume accounting and simply sends one message to an accounting server on ground when a UT hands over to a different satellite. This method does require an application layer implementation in the satellite, but it does not consume as much satellite resources or spectrum.

The detailed examples of systems, devices, and techniques described in connection with FIGS. 1-13 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-13 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 14:
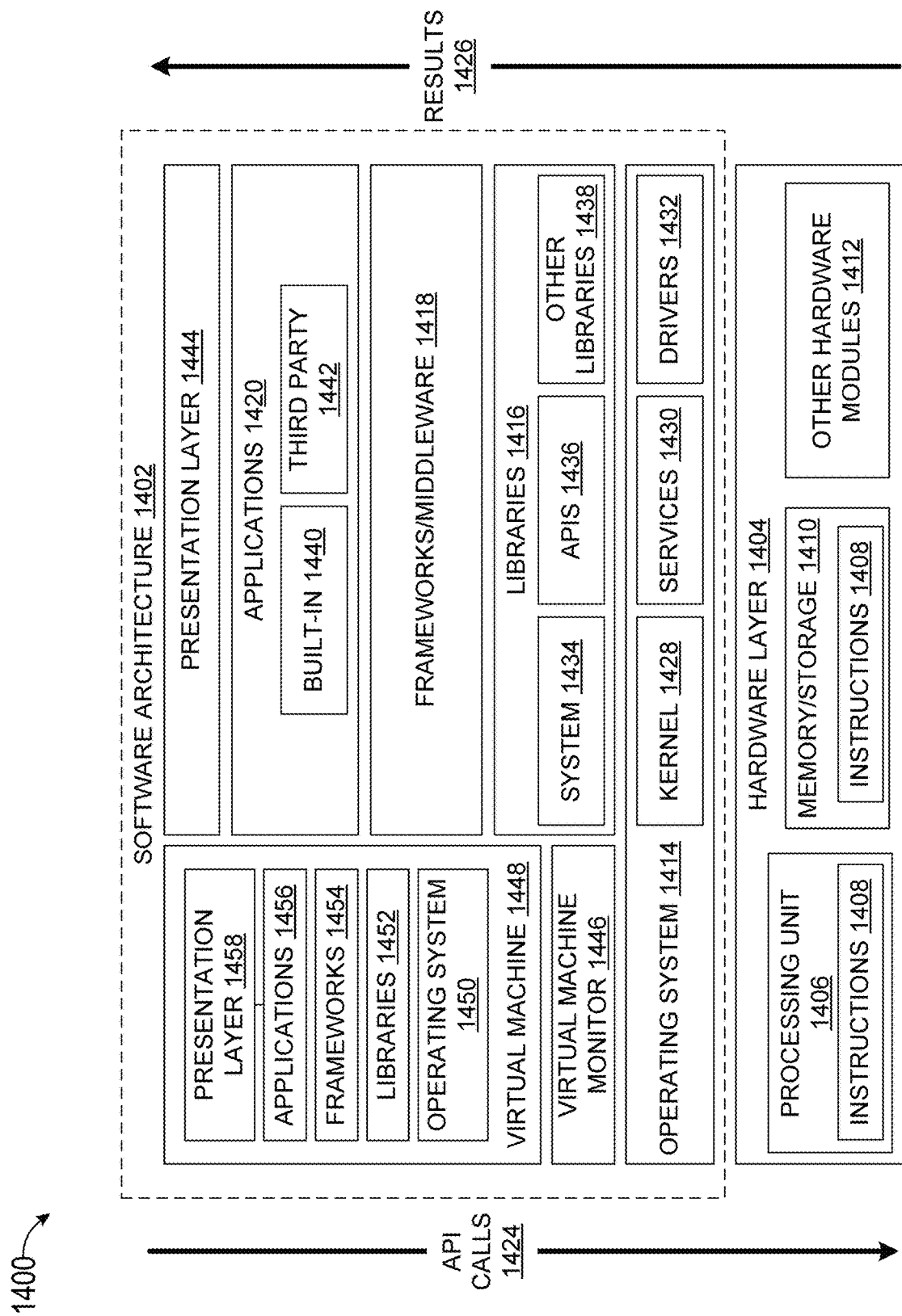
FIG. 14 is a block diagram showing an example software architecture, various portions of which may be used in conjunction with various hardware architectures herein described, which may implement any of the features described herein.

FIG. 14 is a block diagram 1400 illustrating an example software architecture 1402, various portions of which may be used in conjunction with various hardware architectures herein described, which may implement any of the above-described features. FIG. 14 is a non-limiting example of a software architecture and it will be appreciated that many other architectures may be implemented to facilitate the functionality described herein. The software architecture 1402 may execute on hardware such as a machine 1500 of FIG. 15 that includes, among other things, processors 1510, memory 1530, and input/output (I/O) components 1550. A representative hardware layer 1404 is illustrated and can represent, for example, the machine 1500 of FIG. 15. The representative hardware layer 1404 includes a processing unit 1406 and associated executable instructions 1408. The executable instructions 1408 represent executable instructions of the software architecture 1402, including implementation of the methods, modules and so forth described herein. The hardware layer 1404 also includes a memory/storage 1410, which also includes the executable instructions 1408 and accompanying data. The hardware layer 1404 may also include other hardware modules 1412. Instructions 1408 held by processing unit 1408 may be portions of instructions 1408 held by the memory/storage 1410.

The example software architecture 1402 may be conceptualized as layers, each providing various functionality. For example, the software architecture 1402 may include layers and components such as an operating system (OS) 1414, libraries 1416, frameworks 1418, applications 1420, and a presentation layer 1444. Operationally, the applications 1420 and/or other components within the layers may invoke API calls 1424 to other layers and receive corresponding results 1426. The layers illustrated are representative in nature and other software architectures may include additional or different layers. For example, some mobile or special purpose operating systems may not provide the frameworks/middleware 1418.

The OS 1414 may manage hardware resources and provide common services. The OS 1414 may include, for example, a kernel 1428, services 1430, and drivers 1432. The kernel 1428 may act as an abstraction layer between the hardware layer 1404 and other software layers. For example, the kernel 1428 may be responsible for memory management, processor management (for example, scheduling), component management, networking, security settings, and so on. The services 1430 may provide other common services for the other software layers. The drivers 1432 may be responsible for controlling or interfacing with the underlying hardware layer 1404. For instance, the drivers 1432 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1416 may provide a common infrastructure that may be used by the applications 1420 and/or other components and/or layers. The libraries 1416 typically provide functionality for use by other software modules to perform tasks, rather than rather than interacting directly with the OS 1414. The libraries 1416 may include system libraries 1434 (for example, C standard library) that may provide functions such as memory allocation, string manipulation, file operations. In addition, the libraries 1416 may include API libraries 1436 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1416 may also include a wide variety of other libraries 1438 to provide many functions for applications 1420 and other software modules.

The frameworks 1418 (also sometimes referred to as middleware) provide a higher-level common infrastructure that may be used by the applications 1420 and/or other software modules. For example, the frameworks 1418 may provide various graphic user interface (GUI) functions, high-level resource management, or high-level location services. The frameworks 1418 may provide a broad spectrum of other APIs for applications 1420 and/or other software modules.

The applications 1420 include built-in applications 1440 and/or third-party applications 1442. Examples of built-in applications 1440 may include, but are not limited to, a contacts application, a browser application, a location application, a media application, a messaging application, and/or a game application. Third-party applications 1442 may include any applications developed by an entity other than the vendor of the particular platform. The applications 1420 may use functions available via OS 1414, libraries 1416, frameworks 1418, and presentation layer 1444 to create user interfaces to interact with users.

Some software architectures use virtual machines, as illustrated by a virtual machine 1448. The virtual machine 1448 provides an execution environment where applications/modules can execute as if they were executing on a hardware machine (such as the machine 1500 of FIG. 15, for example). The virtual machine 1448 may be hosted by a host OS (for example, OS 1414) or hypervisor, and may have a virtual machine monitor 1446 which manages operation of the virtual machine 1448 and interoperation with the host operating system. A software architecture, which may be different from software architecture 1402 outside of the virtual machine, executes within the virtual machine 1448 such as an OS 1414, libraries 1472, frameworks 1454, applications 1456, and/or a presentation layer 1458.

Figure 15:
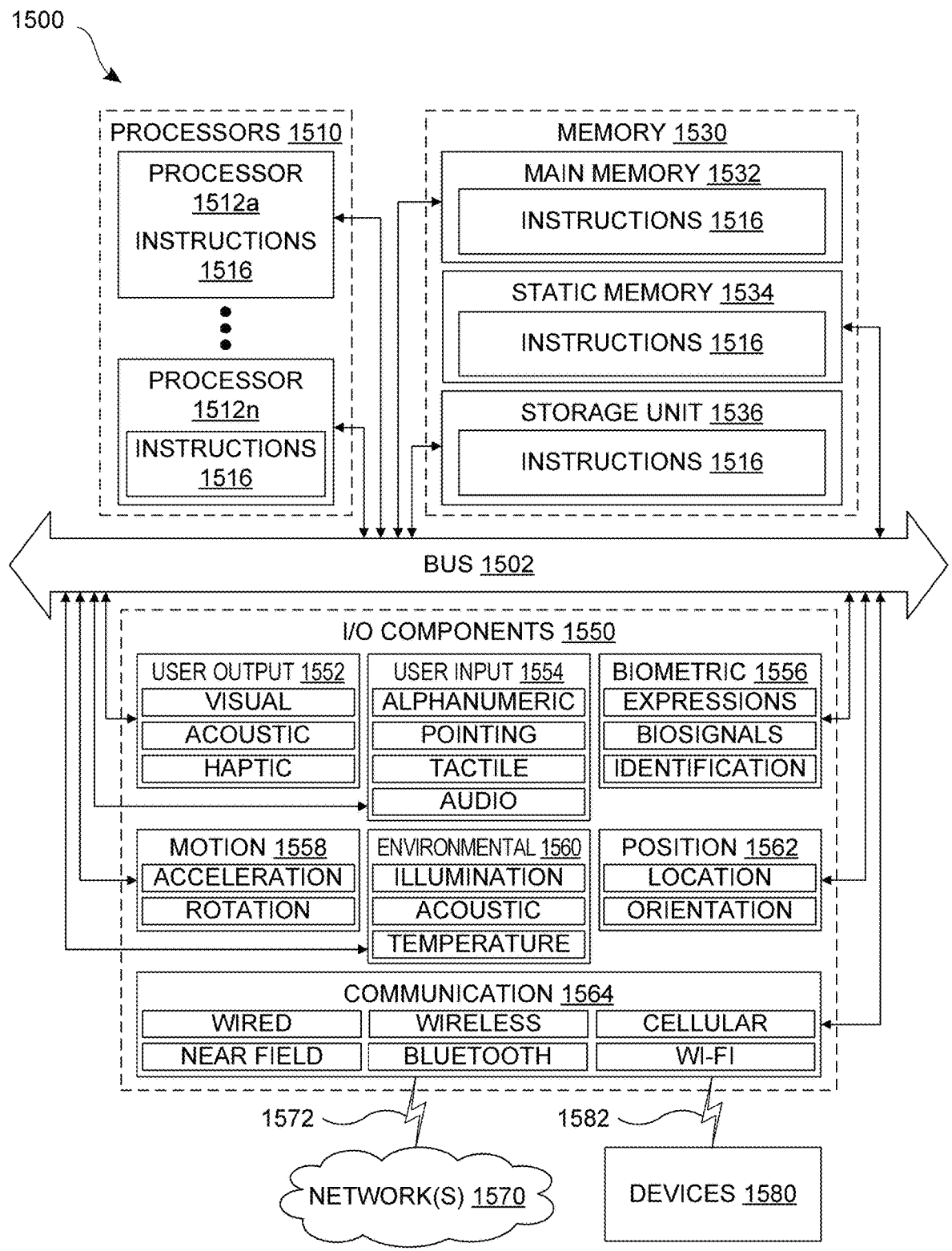
FIG. 15 is a block diagram showing components of an example machine configured to read instructions from a machine-readable medium and perform any of the features described herein.

FIG. 15 is a block diagram illustrating components of an example machine 1500 configured to read instructions from a machine-readable medium (for example, a machine-readable storage medium) and perform any of the features described herein. The example machine 1500 is in a form of a computer system, within which instructions 1516 (for example, in the form of software components) for causing the machine 1500 to perform any of the features described herein may be executed. As such, the instructions 1516 may be used to implement modules or components described herein. The instructions 1516 cause unprogrammed and/or unconfigured machine 1500 to operate as a particular machine configured to carry out the described features. The machine 1500 may be configured to operate as a standalone device or may be coupled (for example, networked) to other machines. In a networked deployment, the machine 1500 may operate in the capacity of a server machine or a client machine in a server-client network environment, or as a node in a peer-to-peer or distributed network environment. Machine 1500 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1500 is illustrated, the term "machine" includes a collection of machines that individually or jointly execute the instructions 1516.

The machine 1500 may include processors 1510, memory 1530, and I/O components 1550, which may be communicatively coupled via, for example, a bus 1502. The bus 1502 may include multiple buses coupling various elements of machine 1500 via various bus technologies and protocols. In an example, the processors 1510 (including, for example, a central processing unit (CPU), a graphics processing unit (GPU), a digital signal processor (DSP), an ASIC, or a suitable combination thereof) may include one or more processors 1512$a$ to 1512$n$ that may execute the instructions 1516 and process data. In some examples, one or more processors 1510 may execute instructions provided or identified by one or more other processors 1510. The term "processor" includes a multi-core processor including cores that may execute instructions contemporaneously. Although FIG. 15 shows multiple processors, the machine 1500 may include a single processor with a single core, a single processor with multiple cores (for example, a multi-core processor), multiple processors each with a single core, multiple processors each with multiple cores, or any combination thereof. In some examples, the machine 1500 may include multiple processors distributed among multiple machines.

The memory/storage 1530 may include a main memory 1532, a static memory 1534, or other memory, and a storage unit 1536, both accessible to the processors 1510 such as via the bus 1502. The storage unit 1536 and memory 1532, 1534 store instructions 1516 embodying any one or more of the functions described herein. The memory/storage 1530 may also store temporary, intermediate, and/or long-term data for processors 1510. The instructions 1516 may also reside, completely or partially, within the memory 1532, 1534, within the storage unit 1536, within at least one of the processors 1510 (for example, within a command buffer or cache memory), within memory at least one of I/O components 1550, or any suitable combination thereof, during execution thereof. Accordingly, the memory 1532, 1534, the storage unit 1536, memory in processors 1510, and memory in I/O components 1550 are examples of machine-readable media.

As used herein, "machine-readable medium" refers to a device able to temporarily or permanently store instructions and data that cause machine 1500 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1516) for execution by a machine 1500 such that the instructions, when executed by one or more processors 1510 of the machine 1500, cause the machine 1500 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1550 may include a wide variety of hardware components adapted to receive input, provide output, produce output, transmit information, exchange information, capture measurements, and so on. The specific I/O components 1550 included in a particular machine will depend on the type and/or function of the machine. For example, mobile devices such as mobile phones may include a touch input device, whereas a headless server or IoT device may not include such a touch input device. The particular examples of I/O components illustrated in FIG. 15 are in no way limiting, and other types of components may be included in machine 1500. The grouping of I/O components 1550 are merely for simplifying this discussion, and the grouping is in no way limiting. In various examples, the I/O components 1550 may include user output components 1552 and user input components 1554. User output components 1552 may include, for example, display components for displaying information (for example, a liquid crystal display (LCD) or a projector), acoustic components (for example, speakers), haptic components (for example, a vibratory motor or force-feedback device), and/or other signal generators. User input components 1554 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1550 may include biometric components 1556, motion components 1558, environmental components 1560, and/or position components 1562, among a wide array of other physical sensor components. The biometric components 1556 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1558 may include, for example, acceleration sensors (for example, an accelerometer) and rotation sensors (for example, a gyroscope). The environmental components 1560 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1562 may include, for example, location sensors (for example, a Global Position System (GPS) receiver), altitude sensors (for example, an air pressure sensor from which altitude may be derived), and/or orientation sensors (for example, magnetometers).

The I/O components 1550 may include communication components 1564, implementing a wide variety of technologies operable to couple the machine 1500 to network(s) 1570 and/or device(s) 1580 via respective communicative couplings 1572 and 1582. The communication components 1564 may include one or more network interface components or other suitable devices to interface with the network (s) 1570. The communication components 1564 may include, for example, components adapted to provide wired communication, wireless communication, cellular communication, Near Field Communication (NFC), Bluetooth communication, Wi-Fi, and/or communication via other modalities. The device(s) 1580 may include other machines or various peripheral devices (for example, coupled via USB).

In some examples, the communication components 1564 may detect identifiers or include components adapted to detect identifiers. For example, the communication components 1564 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1562, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A satellite communication system comprising:
   a Medium Earth Orbit (MEO) satellite constellation with a plurality of MEO satellites;
   a Low Earth Orbit (LEO) satellite constellation with a plurality of LEO satellites; and
   wherein the plurality of MEO satellites and the plurality of LEO satellites are configured to support a MEO-LEO satellite link that allows communication between a MEO satellite in the MEO constellation and a LEO satellite in the LEO constellation.

2. The satellite communication system of claim 1, further comprising a first user terminal communicating with a first LEO satellite and a second LEO satellite communicating with a second user terminal located at a geographical location remote from that of the first user terminal,
   wherein the satellite communication system provides a non-terrestrial communication path directly from the first user terminal to the second user terminal by communications between the first and second LEO satellites in the LEO constellation and the MEO satellite in the MEO constellation.

3. The satellite communication system of claim 1, further comprising a first user terminal communicating with a first LEO satellite and a first MEO satellite communicating with a second user terminal located at a geographical location remote from that of the first user terminal,
   wherein the satellite communication system provides a non-terrestrial communication path directly from the first user terminal to the second user terminal by communications between the first LEO satellite in the LEO constellation and the MEO satellite in the MEO constellation.

4. The satellite communication system of claim 2, further comprising a direct user terminal to user terminal security association that supports sending encrypted data directly from the first user terminal to the second user terminal with a private key.

5. The satellite communication system of claim 3, further comprising a direct user terminal to user terminal security association that supports sending encrypted data directly from the first user terminal to the second user terminal with a private key.

6. The satellite communication system of claim 1, wherein the LEO satellite constellation is configured to provide global network coverage for secure Internet Protocol (IP), and wherein the MEO satellite constellation is configured to provide backhaul connectivity for the LEO satellites.

7. The satellite communication system of claim 1, wherein the LEO satellite constellation is configured to provide hot spot coverage for the satellite communication system.

8. The satellite communication system of claim 1, wherein the MEO satellites and the LEO satellites comprise optical inter-satellite links for communication with satellites in the same constellation.

9. The satellite communication system of claim 1, wherein the MEO-LEO link is an optical inter-satellite link.

10. The satellite communication system of claim 1, wherein at least one satellite of the LEO satellite constellation is configured to support a link to communicate with a geosynchronous satellite.

11. The satellite communication system of claim 1, wherein at least one satellite of the MEO satellite constellation is configured to support a link to communicate with a geosynchronous satellite.

12. The satellite communication system of claim 2, further comprising a direct user terminal to user terminal control plane communication link between a first radio resource control user-user (RRC-UU) block in the first user terminal and a second RRC-UU block in the second user terminal.

13. The satellite communication system of claim 12, wherein the first and second RRC-UU block communicate to facilitate secure communication between the first and second user terminals by communicating an updated egress satellite identification which is placed in an IP extension header and used to route data through the network.

14. A satellite communication system comprising:
   a Medium Earth Orbit (MEO) satellite constellation with a plurality of MEO satellites;
   a Low Earth Orbit (LEO) satellite constellation with a plurality of LEO satellites;
   wherein the plurality of MEO satellites and the plurality of LEO satellites are configured to support a MEO-LEO satellite link that allows communication between a MEO satellite in the MEO constellation and a LEO satellite in the LEO constellation;
   a first user terminal communicating with a first LEO satellite and a second LEO satellite communicating with a second user terminal located at a geographical location remote from that of the first user terminal;
   a direct user terminal to user terminal security association that supports sending encrypted data directly from the first user terminal to the second user terminal with a private key; wherein:
   the plurality of MEO satellites and the LEO satellite further comprise an MEO-LEO link for communicating with a satellite in another constellation; and
   the satellite communication system provides a non-terrestrial communication path directly from the first user terminal to the second user terminal by communications between the first and second LEO satellites in the LEO constellation and the MEO satellite in the MEO constellation.

15. The satellite communication system of claim 14, wherein the plurality of MEO satellites and the LEO satellite further comprise an MEO-LEO link for communicating with a satellite in another constellation.

16. The satellite communication system of claim 15, wherein the MEO-LEO link is an optical inter-satellite link.

17. The satellite communication system of claim 14, wherein at least one satellite of the LEO constellation and MEO satellite constellation has a link to communicate with a geosynchronous satellite system.

18. The satellite communication system of claim 14, further comprising a direct user terminal to user terminal control plane communication link between a first radio resource control user (RRC-U) block in the first user terminal and a second RRC-U block in the second user terminal.

19. The satellite communication system of claim 15, wherein the first and second RRC-U block communicate to facilitate secure communication between the first and second user terminals.

20. A satellite communication system comprising:
a Medium Earth Orbit (MEO) satellite constellation with a plurality of MEO satellites;
a Low Earth Orbit (LEO) satellite constellation with a plurality of LEO satellites; and
wherein the plurality of MEO satellites and the plurality of LEO satellites are configured to support a MEO-LEO satellite link that allows communication between a MEO satellite in the MEO constellation and a LEO satellite in the LEO constellation, wherein the plurality of MEO satellites and the LEO satellite further comprise an optical inter-satellite link for communicating with a satellite in another constellation;
a first user terminal communicating with a first LEO satellite and a second LEO satellite communicating with a second user terminal located at a geographical location remote from that of the first user terminal;
a direct user terminal to user terminal security association that supports sending encrypted data directly from the first user terminal to the second user terminal with a private key;
a direct user terminal to user terminal control plane communication between a first radio resource control user (RRC-U) block in the first user terminal and a second RRC-U block in the second user terminal; wherein:
the plurality of MEO satellites and the LEO satellites further comprise an MEO-LEO link for communicating with a satellite in another constellation;
the satellite communication system provides a non-terrestrial communication path directly from the first user terminal to the second user terminal by communications between the first and second LEO satellites in the LEO constellation and the MEO satellite in the MEO constellation, and
at least one satellite of the LEO constellation and MEO satellite constellation has a link to communicate with a geosynchronous satellite system.

* * * * *